United States Patent
Harshbarger et al.

(10) Patent No.: US 10,013,815 B2
(45) Date of Patent: Jul. 3, 2018

(54) INFORMATION SYSTEM FOR INDUSTRIAL VEHICLES

(75) Inventors: Aaron H. Harshbarger, Sidney, OH (US); David K. Tinnerman, New Knoxville, OH (US); Timothy A. Wellman, Coldwater, OH (US); Jeffrey C. Whitford, Troy, OH (US); Dean E. Winner, Celina, OH (US)

(73) Assignee: Crown Equipment Corporation, New Bremen, OH (US)

( * ) Notice: Subject to any disclaimer, the term of this patent is extended or adjusted under 35 U.S.C. 154(b) by 1261 days.

(21) Appl. No.: 12/751,120

(22) Filed: Mar. 31, 2010

(65) Prior Publication Data
US 2010/0228428 A1 Sep. 9, 2010

Related U.S. Application Data

(63) Continuation-in-part of application No. 12/569,384, filed on Sep. 29, 2009, which is a continuation-in-part (Continued)

(51) Int. Cl.
*G07C 5/00* (2006.01)
*G06Q 10/06* (2012.01)

(52) U.S. Cl.
CPC ............ *G07C 5/008* (2013.01); *G06Q 10/06* (2013.01)

(58) Field of Classification Search
CPC ............... G07C 5/008; G06Q 10/0631
(Continued)

(56) References Cited

U.S. PATENT DOCUMENTS

| 3,788,666 A | 1/1974 | Kramer et al. |
| 4,009,375 A | 2/1977 | White et al. |

(Continued)

FOREIGN PATENT DOCUMENTS

| AU | 2010289731 B2 | 3/2012 |
| CN | 1468409 A | 1/2004 |

(Continued)

OTHER PUBLICATIONS

Drive Down Your Total Cost of Ownership; Powerkey Fleet Management Systems; Doc. #5001, Rev. #1.0 Oct. 2004; International Electronics, Inc.; Canton, MA.

(Continued)

*Primary Examiner* — Andre D Boyce
(74) *Attorney, Agent, or Firm* — Stevens & Showalter, LLP

(57) ABSTRACT

Industrial vehicles communicate across a wireless environment and the wireless communication, data collection and/or processing capabilities of industrial vehicles are leveraged against robust software solutions to implement enterprise wide asset management functions, to integrate industrial vehicle data into existing enterprise workflows and/or to enable trusted third party integration into the enterprise for enhanced asset and/or workflow management. Still further, wireless communication, data collection and/or processing capabilities of industrial vehicles are leveraged with robust software solutions that aggregate and analyze data across multiple enterprises and/or promote the exchange of information between independent entities.

20 Claims, 8 Drawing Sheets

Related U.S. Application Data of application No. 11/956,045, filed on Dec. 13, 2007, now Pat. No. 8,249,910, application No. 12/751,120, which is a continuation-in-part of application No. 11/956,022, filed on Dec. 13, 2007, now Pat. No. 8,060,400.

(60) Provisional application No. 61/166,494, filed on Apr. 3, 2009, provisional application No. 61/233,394, filed on Aug. 12, 2009, provisional application No. 61/238,916, filed on Sep. 1, 2009, provisional application No. 60/869,845, filed on Dec. 13, 2006.

(58) Field of Classification Search
USPC ........................................................ 701/29.1
See application file for complete search history.

(56) References Cited

U.S. PATENT DOCUMENTS

| | | | |
|---|---|---|---|
| 4,251,813 | A | 2/1981 | Carre |
| 4,258,421 | A | 3/1981 | Juhasz et al. |
| 4,612,620 | A | 9/1986 | Davis et al. |
| 4,638,289 | A | 1/1987 | Zottnik |
| 4,677,429 | A | 6/1987 | Glotzbach |
| 4,728,922 | A | 3/1988 | Christen et al. |
| 4,757,712 | A | 7/1988 | Jurca |
| 4,855,711 | A | 8/1989 | Harrop et al. |
| 4,868,866 | A | 9/1989 | Williams, Jr. |
| 4,949,263 | A | 8/1990 | Jurca |
| 5,058,044 | A | 10/1991 | Stewart et al. |
| 5,173,856 | A | 12/1992 | Purnell et al. |
| 5,211,115 | A | 5/1993 | Maier et al. |
| 5,257,190 | A | 10/1993 | Crane |
| 5,267,147 | A | 11/1993 | Harshaw et al. |
| 5,289,378 | A | 2/1994 | Miller et al. |
| 5,442,553 | A | 8/1995 | Parrillo |
| 5,454,074 | A | 9/1995 | Hartel et al. |
| 5,457,629 | A | 10/1995 | Miller et al. |
| 5,465,207 | A | 11/1995 | Boatwright et al. |
| 5,513,111 | A | 4/1996 | Wortham |
| 5,513,242 | A | 4/1996 | Mukerjee et al. |
| 5,526,269 | A | 6/1996 | Ishibashi et al. |
| 5,590,057 | A | 12/1996 | Fletcher et al. |
| 5,610,372 | A | 3/1997 | Phillips et al. |
| 5,625,555 | A | 4/1997 | Davis |
| 5,650,928 | A | 7/1997 | Hagenbuch |
| 5,660,246 | A | 8/1997 | Kaman |
| 5,671,436 | A | 9/1997 | Morris et al. |
| 5,680,328 | A | 10/1997 | Skorupski et al. |
| 5,682,142 | A | 10/1997 | Loosmore et al. |
| 5,694,318 | A | 12/1997 | Miller et al. |
| 5,710,566 | A | 1/1998 | Grabow et al. |
| 5,712,625 | A | 1/1998 | Murphy |
| 5,714,946 | A | 2/1998 | Gottshall et al. |
| 5,715,905 | A | 2/1998 | Kaman |
| 5,737,215 | A | 4/1998 | Schricker et al. |
| 5,740,035 | A | 4/1998 | Cohen et al. |
| 5,747,786 | A | 5/1998 | Cargin, Jr. et al. |
| 5,754,562 | A | 5/1998 | Chen |
| 5,781,871 | A | 7/1998 | Mezger et al. |
| 5,802,545 | A | 9/1998 | Coverdill |
| 5,838,251 | A | 11/1998 | Brinkmeyer et al. |
| 5,844,473 | A | 12/1998 | Kaman |
| 5,873,070 | A | 2/1999 | Bunt et al. |
| 5,890,086 | A | 3/1999 | Wellman et al. |
| 5,895,431 | A | 4/1999 | Miller et al. |
| 5,904,727 | A | 5/1999 | Prabhakaran |
| 5,928,292 | A | 7/1999 | Miller et al. |
| 5,948,026 | A | 9/1999 | Beemer, II et al. |
| 5,966,658 | A | 10/1999 | Kennedy, III et al. |
| 5,969,433 | A | 10/1999 | Maggiora et al. |
| 5,987,499 | A | 11/1999 | Morris et al. |
| 6,028,537 | A | 2/2000 | Suman et al. |
| 6,076,028 | A | 6/2000 | Donnelly et al. |
| 6,109,648 | A | 8/2000 | Luo et al. |
| 6,112,206 | A | 8/2000 | Morris et al. |
| 6,195,605 | B1 | 2/2001 | Tabler et al. |
| 6,212,449 | B1 | 4/2001 | Wellman et al. |
| 6,240,365 | B1 | 5/2001 | Bunn |
| 6,292,437 | B1 | 9/2001 | Beard |
| 6,295,492 | B1 | 9/2001 | Lang et al. |
| 6,339,745 | B1 | 1/2002 | Novik |
| 6,411,203 | B1 | 6/2002 | Lesesky et al. |
| 6,417,760 | B1 | 7/2002 | Mabuchi et al. |
| 6,430,485 | B1 | 8/2002 | Hullinger |
| 6,532,416 | B1 | 3/2003 | Mueller |
| 6,584,403 | B2 | 6/2003 | Bunn |
| 6,662,068 | B1 | 12/2003 | Ghaffari |
| 6,671,622 | B2 | 12/2003 | McCall et al. |
| 6,714,857 | B2 | 3/2004 | Kapolka et al. |
| 6,744,436 | B1 | 6/2004 | Chirieleison, Jr. et al. |
| 6,754,562 | B2 | 6/2004 | Strege et al. |
| 6,799,099 | B2 | 9/2004 | Zeitler et al. |
| 6,804,626 | B2 | 10/2004 | Manegold et al. |
| 6,810,406 | B2 | 10/2004 | Schlabach et al. |
| 6,816,063 | B2 | 11/2004 | Kubler et al. |
| 6,832,139 | B2 | 12/2004 | Johnson et al. |
| 6,859,697 | B2 | 2/2005 | Muragishi |
| 6,862,443 | B2 | 3/2005 | Witte |
| 6,865,436 | B2 | 3/2005 | O'Connor et al. |
| 6,873,909 | B2 | 3/2005 | Borugian |
| 6,892,131 | B2 | 5/2005 | Coffee et al. |
| 6,898,493 | B2 | 5/2005 | Ehrman et al. |
| 6,952,680 | B1 | 10/2005 | Melby et al. |
| 7,062,446 | B1 | 6/2006 | Suhy, Jr. et al. |
| 7,117,075 | B1 | 10/2006 | Larschan et al. |
| 7,152,035 | B1 | 12/2006 | Suhy, Jr. |
| 7,165,040 | B2 | 1/2007 | Ehrman et al. |
| 7,171,381 | B2 | 1/2007 | Ehrman et al. |
| 7,346,439 | B2 | 3/2008 | Bodin |
| 7,356,494 | B2 | 4/2008 | Ehrman et al. |
| 7,387,243 | B2 | 6/2008 | Magens et al. |
| 7,395,275 | B1 | 7/2008 | Parent |
| 7,460,016 | B2 | 12/2008 | Sorenson, Jr. et al. |
| 7,583,413 | B2 | 9/2009 | Nojiri et al. |
| 7,706,938 | B2 * | 4/2010 | Palladino ............... 701/29.4 |
| 8,060,400 | B2 | 11/2011 | Wellman |
| 8,249,910 | B2 | 8/2012 | Wellman et al. |
| 2001/0018628 | A1 | 8/2001 | Jenkins et al. |
| 2001/0018639 | A1 | 8/2001 | Bunn |
| 2001/0037298 | A1 | 11/2001 | Ehrman et al. |
| 2002/0077944 | A1 | 6/2002 | Bly et al. |
| 2002/0082966 | A1 | 6/2002 | O'Brien et al. |
| 2002/0087345 | A1 * | 7/2002 | Bly et al. ............... 705/1 |
| 2002/0089434 | A1 | 7/2002 | Ghazarian |
| 2002/0107873 | A1 | 8/2002 | Winkler et al. |
| 2002/0173910 | A1 | 11/2002 | McCall et al. |
| 2002/0186144 | A1 | 12/2002 | Meunier |
| 2002/0193910 | A1 | 12/2002 | Strege et al. |
| 2003/0028323 | A1 | 2/2003 | Zeitler et al. |
| 2003/0114980 | A1 | 6/2003 | Klausner et al. |
| 2003/0130913 | A1 | 7/2003 | Ehrman et al. |
| 2003/0141964 | A1 | 7/2003 | Su et al. |
| 2003/0163249 | A1 | 8/2003 | Kapolka et al. |
| 2003/0195825 | A1 | 10/2003 | Ehrman et al. |
| 2003/0216976 | A1 | 11/2003 | Ehrman et al. |
| 2003/0225707 | A1 | 12/2003 | Ehrman et al. |
| 2003/0233177 | A1 | 12/2003 | Johnson et al. |
| 2004/0015419 | A1 | 1/2004 | Ehrman et al. |
| 2004/0039504 | A1 | 2/2004 | Coffee et al. |
| 2004/0049324 | A1 | 3/2004 | Walker |
| 2004/0085195 | A1 | 5/2004 | McKibbon |
| 2004/0093109 | A1 | 5/2004 | O'Connor et al. |
| 2004/0093291 | A1 | 5/2004 | Bodin |
| 2004/0102869 | A1 | 5/2004 | Anderson et al. |
| 2004/0106376 | A1 | 6/2004 | Forster |
| 2004/0139806 | A1 | 7/2004 | Christmas |
| 2004/0262387 | A1 | 12/2004 | Hart |
| 2005/0002354 | A1 | 1/2005 | Kelly et al. |
| 2005/0029872 | A1 | 2/2005 | Ehrman et al. |
| 2005/0049021 | A1 | 3/2005 | Nedelcu et al. |
| 2005/0052281 | A1 | 3/2005 | Bann |
| 2005/0065861 | A1 | 3/2005 | Bann |

(56) References Cited

U.S. PATENT DOCUMENTS

| | | | |
|---|---|---|---|
| 2005/0086239 A1 | 4/2005 | Swann et al. | |
| 2005/0108089 A1 | 5/2005 | Ehrman et al. | |
| 2005/0131729 A1 | 6/2005 | Melby et al. | |
| 2005/0240378 A1 | 10/2005 | Smith et al. | |
| 2006/0052918 A1 | 3/2006 | McLeod et al. | |
| 2006/0053075 A1* | 3/2006 | Roth et al. ............ | 705/50 |
| 2006/0111822 A1 | 5/2006 | Simon | |
| 2006/0142913 A1 | 6/2006 | Coffee et al. | |
| 2006/0208890 A1 | 9/2006 | Ehrman et al. | |
| 2006/0208891 A1 | 9/2006 | Ehrman et al. | |
| 2006/0208892 A1 | 9/2006 | Ehrman et al. | |
| 2006/0229906 A1 | 10/2006 | Suhy, Jr. et al. | |
| 2007/0167105 A1 | 7/2007 | Lorelli et al. | |
| 2007/0208476 A1 | 9/2007 | Baginski et al. | |
| 2007/0208477 A1 | 9/2007 | Baginski et al. | |
| 2007/0213897 A1 | 9/2007 | Estes et al. | |
| 2007/0229251 A1 | 10/2007 | Ehrman et al. | |
| 2007/0239292 A1 | 10/2007 | Ehrman et al. | |
| 2007/0239324 A1 | 10/2007 | Ehrman et al. | |
| 2007/0290840 A1 | 12/2007 | Ehrman et al. | |
| 2008/0015955 A1 | 1/2008 | Ehrman et al. | |
| 2008/0068170 A1 | 3/2008 | Ehrman et al. | |
| 2008/0068171 A1 | 3/2008 | Ehrman et al. | |
| 2008/0136584 A1 | 6/2008 | Ehrman et al. | |
| 2008/0140440 A1 | 6/2008 | Ehrman et al. | |
| 2008/0140482 A1 | 6/2008 | Ehrman et al. | |
| 2008/0140483 A1 | 6/2008 | Ehrman et al. | |
| 2008/0140544 A1 | 6/2008 | Ehrman et al. | |
| 2008/0154691 A1 | 6/2008 | Wellman et al. | |
| 2008/0154712 A1 | 6/2008 | Wellman | |
| 2008/0183522 A1 | 7/2008 | Ehrman et al. | |
| 2008/0228346 A1 | 9/2008 | Lucas et al. | |
| 2008/0269977 A1 | 10/2008 | Palladino | |
| 2009/0037206 A1 | 2/2009 | Byrne et al. | |
| 2009/0051510 A1 | 2/2009 | Follmer et al. | |
| 2009/0099897 A1 | 4/2009 | Ehrman et al. | |
| 2010/0039247 A1 | 2/2010 | Ziegler et al. | |
| 2011/0022442 A1 | 1/2011 | Wellman et al. | |
| 2011/0040440 A1 | 2/2011 | de Oliveira et al. | |

FOREIGN PATENT DOCUMENTS

| | | |
|---|---|---|
| CN | 101075375 A | 11/2007 |
| CN | 101461271 A | 6/2009 |
| DE | 10304658 A1 | 8/2004 |
| EP | 0416171 A2 | 3/1991 |
| EP | 1221677 A1 | 7/2002 |
| EP | 1622294 A2 | 2/2006 |
| EP | 2033933 A2 | 3/2009 |
| GB | 2288050 A | 10/1995 |
| GB | 2352521 A | 1/2001 |
| JP | 06282328 | 10/1994 |
| JP | 2002187698 A | 7/2002 |
| JP | 2005521170 A | 7/2005 |
| JP | 2008056436 A | 3/2008 |
| JP | 2008201554 A | 9/2008 |
| KR | 1019960000640 | 1/1996 |
| KR | 1020060055517 A | 5/2006 |
| KR | 1020090013529 A | 2/2009 |
| WO | 2000070530 | 11/2000 |
| WO | 0117825 A1 | 3/2001 |
| WO | 0137118 A2 | 5/2001 |
| WO | 0137121 A2 | 5/2001 |
| WO | 03025863 A2 | 3/2003 |
| WO | 03042891 A1 | 5/2003 |
| WO | 03061248 A2 | 7/2003 |
| WO | 2004104941 A2 | 12/2004 |
| WO | 2004112403 A2 | 12/2004 |
| WO | 2006022609 A1 | 3/2006 |

OTHER PUBLICATIONS

Asset Communicator—Magnetic Card Reader; I.D. Systems, Inc.
Vehicle Asset Communicator—Weatherproof 20-Key Keypad; I.D. Systems, Inc.
Softwaresystem—Industrial Fleet Management; I.D. Systems, Inc.
Smith, Greg; Wireless Management of Industrial Vehicles; Industrial Utility Vehicle & Mobile Equipment; Mar./Apr. 2004,vol. 6, Issue 2; Webcom Communications Corp.
SD I System, Truck Log; Jun. 2003; TL001; Davis Derby Limited; Derby England.
Easyview Direct 2 System Fleet Management—Monitor, Measure & Control, Truck Log; Jun. 2003;TL004; Davis Derby Limited; Derby England.
Airport Vehicle Drive Access Control System, Truck Log; Sep. 2004; TL005; Davis Derby Limited; Derby England.
In the Driving Seat; Toyota Industrial Equipment; Jun. 2005.
Futuristic Fleet for Contract Foods; Yale Europe; Jun. 10, 2008; Material Handling World.
Keytroller Systems: Risk Minimisation in Forklift Operations; Forklift action.com; May 18, 2007, Newsletter #311.
Fleet Management Systems; Forklift action.com; May 24, 2007; Newsletter #311.
J.C. Fuentes Michel et al.; A Novell Wireless Forklift Positioning System for Indoor and Outdoor Use; Proceedings of the 5th Workshop on Positioning, Navigation and Communication 2008; (WPNC '08); pp. 219-227.
Indoor Tracking Technology Demonstration Successful; Forklift action.com; Oct. 9, 2008; Newsletter #381.
New System for Remote Monitoring; Forklift action.com; Sep. 3, 2008; Newsletter #376.
RFID Technology and Personnel Protection System in Jungheinrich's EKX 513-515 Turret Trucks Mean Much Greater Efficiency and Safety; Jungheinrich-us.com; Nov. 24, 2008.
Athina Nickitas-Etienne; International Preliminary Report on Patentability and and Written Opinion of the International Searching Authority; International Application No. PCT/US2007/087440; dated Jun. 16, 2009; International Bureau of WIPO; Geneva Switzerland.
Jae Gwi Choi; International Search Report and Written Opinion of the International Searching Authority; International No. PCT/US2010/029327; dated Oct. 28, 2010; Korean Intellectual Property Office Application.
Mohammad R. Ullah Masud; Office Action-Non-Final Rejection in U.S. Appl. No. 11/956,022; dated Sep. 1, 2010; U.S. Patent and Trademark Office; Alexandria, VA.
Jae Gwi Choi; International Search Report and Written Opinion of the International Searching Authority; International Application No. PCT/US2010/045267; dated Apr. 27, 2011; Korean Intellectual Property Office.
Jae Gwi Choi; International Search Report and Written Opinion of the International Searching Authority; International Application No. PCT/US2010/047090; dated Apr. 27, 2011; Korean Intellectual Property Office.
Mohammad R. Ullah Masud; Final Office Action in U.S. Appl. No. 11/956,022; dated Feb. 16, 2011; U.S Patent and Trademark Office; Alexandria, VA.
Office Action issued in Chinese Application No. 200780051076.6; dated Feb. 23, 2011; State Intellectual Property Office of the People's Republic of China.
Mohammad R. Ullah Masud; Non-final Office Action in U.S. Appl. No. 11/956,045; dated Mar. 1, 2011; U.S. Patent and Trademark Office; Alexandria, VA.
Office Action issued in Russian Application No. 2011144395; dated Oct. 30, 2013; Federal Institute of Industrial Property.
Mexican Office action dated Mar. 25, 2014 for Mexican patent application No. MX/a/2011/010437; Mexican Institute of Intellectual Property (IMPI); see p. 1 for cited reference.
English translation of the text portion of the notification of the first Office Action issued in Chinese Application No. 201080015230.5, dated Dec. 25, 2013, State Intellectual Property Office of the People's Republic of China.
Australian Patent Examination Report dated Jan. 28, 2014 for Australian patent application No. 2010232704, Australian Government, IP Australia.

(56) References Cited

OTHER PUBLICATIONS

Breidenich, Markus; Supplementary European Search Report for European Patent Application No. 10759324.6; dated Mar. 20, 2014, European Patent Office; Munich, Germany.
Notification of the second Office Action for Chinese Patent Application No. 201080015230.5, including a translation of the text portion of the Office Action, dated Sep. 1, 2014, State Intellectual Property Office of the People's Republic of China.
Crown Equipment Corporation, Third Office Action and Search Report for Chinese Patent Application No. CN201080015230.5, including a translation of the text portion of the Office Action; dated Feb. 11, 2015l State Intellectual Property Office of the People's Republic of China.
Hector Javier Sanchez Vargas; Second Office Action for Mexican Patent Application No. MX/a/2011/010437; dated Sep. 26, 2014; Mexican Institute of Intellectual Property.
Ullah Masud, Mohammad, Final Office Action, U.S. Appl. No. 11/956,045, dated Sep. 14, 2011, U.S. Patent and Trademark Office, Alexandria, VA.
Ullah Masud, Mohammad, Office Action, U.S. Appl. No. 12/569,384, dated Apr. 4, 2012, U.S. Patent and Trademark Office, Alexandria, VA.
Ullah Masud, Mohammad, Final Office Action, U.S. Appl. No. 12/569,384, dated Nov. 9, 2012, U.S. Patent and Trademark Office, Alexandria, VA.
Ullah Masud, Mohammad, Office Action, U.S. Appl. No. 12/569,384, dated Jun. 6, 2014, U.S. Patent and Trademark Office, Alexandria, VA.
Ullah Masud, Mohammad, Final Office Action, U.S. Appl. No. 12/569,384, dated Jul. 20, 2015, U.S. Patent and Trademark Office, Alexandria, VA.
Ullah Masud, Mohammad, Office Action, U.S. Appl. No. 12/569,384, dated Apr. 11, 2016, U.S. Patent and Trademark Office, Alexandria, VA.
Ullah Masud, Mohammad, Final Office Action, U.S. Appl. No. 12/569,384, dated Nov. 2, 2016, U.S. Patent and Trademark Office, Alexandria, VA.
Australian Patent Examination Report dated Jan. 17, 2014 for Australian Patent Application No. 2010300762; Australian Government, IP Australia.
Grant, Arthur Gary; Examination Report; Canadian Patent Application No. 2,773,788; dated Feb. 25, 2016; Canadian Intellectual Property Office; Gatineau, QC, Canada.
Chinese Office Action dated May 11, 2015 for Chinese Patent Application No. 201080043417.6; State Intellectual Property Office of the People's Republic of China.
Shen, Xiaodong; Second Chinese Office Action dated Oct. 31, 2014 for Chinese Patent Application No. 201080043417.6, State Intellectual Property Office of the People's Republic of China.
Chinese Office Action dated Mar. 4, 2014 for Chinese Patent Application No. 201080043411.6; State Intellectual Propeity Office of the People's Republic of China.
Pfyffer, Gregor; Extended European Search Report; European Patent Application No. 10821137.6; dated Nov. 15, 2016; European Patent Office; Munich, Germany.
International Search Report and the Written Opinion of the International Searching Authority; International Application No. PCT/US2010/050634; dated Jun. 24, 2011; Korean Intellectual Property Office; Republic of Korea.
Dong-Ki Han; Notice of Preliminary Rejection; Korean Patent Application No. 10-2012-7010757; dated Jun. 3, 2016; Korean Intellectual Property Office; Daejeon, Republic of Korea.
Russian Office Action dated Dec. 17, 2014 for Russian Patent Application No. 2012115652; Patent Office of Russian Federation.
Komarchuk, A.S.; Russian Office Action dated Jul. 30, 2014 for Russian Patent Application No. 2012115652; Patent Office of Russian Federation.
International Preliminary Report on Patentability; International Application No. PCT/US2010/050634; dated Apr. 12, 2012; The International Bureau of WIPO; Geneva, Switzerland.
Office Action; Canadian Patent Application No. 2,939,588; dated Sep. 5, 2017; Canadian Intellectual Propelty Office; Canada.
Decision of Patent Grant; Korean Patent Application No. 10-2016-7030489; dated Aug. 25, 2017; Korean Intellectual Property Office; Korea.
Gabler, "Development of a Low-Cost Automated Crash Notification System"; Final Report; dated Jul. 2001; Rowan University, Department of Mechanical Engineering.
Notice of Preliminary Rejection; Korean Patent Application No. 10-2012-7008071; dated Jul. 26, 2016; Korean Intellectual Property Office; Korea.
Notice of Preliminary Rejection; Korean Patent Application No. 10-2011-7026007; dated Jan. 18, 2016; Japan Patent Office; Tokyo, Japan.
Second Official Action; EP Application No. 10814328.0; dated Jan. 18, 2017; European Patent Office; Munich, Germany.
First Official Action; EP Patent Application No. 10814328.0; dated Aug. 31, 2015; European Patent Office; Munich, Germany.
Sandler, Howard; Office Action; Canadian Patent Application No. 2,771,170; dated Apr. 18, 2017; Canadian Intellectual Property Office; Canada.
Sandler, Howard; Office Action; Canadian Patent Application No. 2,771,170; dated May 18, 2016; Canadian Intellectual Property Office; Canada.
Final Rejection; Korean Patent Application No. 1020117026007; dated Sep. 29, 2016; Korean Intellectual Property Office; Korea.
Office Action; Mexican Patent Application No. MX2011010437; dated Apr. 28, 2015; IMPI; Mexico.
Office Action; Mexican Patent Application No. MX2011010437; dated Aug. 15, 2016; IMPI; Mexico.
Office Action; Mexican Patent Application No. MX2011010437; dated Dec. 8, 2015; IMPI; Mexico.
Sandler, Howard; Office Action; Canadian Patent Application No. 2,757,453; dated Aug. 14, 2017; Canadian Intellectual Property Office; Canada.
Sandler, Howard; Office Action; Canadian Patent Application No. 2,757,453; dated Dec. 15, 2016; Canadian Intellectual Property Office; Canada.
Sandler, Howard; Office Action; Canadian Patent Application No. 2,757,453; dated Feb. 11, 2016; Canadian Intellectual Property Office; Canada.
Official Action; EP Patent Application No. 10759324.6; dated Nov. 8, 2016; European Patent Office; Munich, Germany.
Official Action; EP Patent Application No. 10759324.6; dated Sep. 1, 2015; European Patent Office; Munich, Germany.

* cited by examiner

| On/Off | Pin No | Name | Input Type | Range | Activation | Threshold | Direction | Engine On |
|---|---|---|---|---|---|---|---|---|
| Off | 1 | Sensor | Switch | Low | Low | | | |
| Off | 12 | Pressure | Switch | Low | Low | | | |
| ON | 15 | Key | Switch | High | High | | | |
| ON | 16 | Forward | Encoder | | | | No Invert | |
| ON | 17 | Reverse | Encoder | | | | No Invert | |
| ON | 19 | Traction Index | Switch | Low | Low | | | |
| OFF | 20 | Spare | Switch | Low | Low | | | |
| ON | 22 | Seat Switch | Switch | Low | Low | | | |
| ON | 23 | Brakes | Switch | Low | Low | | | |
| ON | 28 | Hydraulic A | Encoder | | | | No Invert | |
| ON | 29 | Hydraulic B | Encoder | | | | No Invert | |
| ON | 32 | HYD Index | Switch | Low | Low | | | |
| ON | 33 | Trav Left | Switch | Low | Low | | | |
| ON | 34 | Pivot | Switch | Low | Low | | | |
| ON | 35 | Trav Right | Switch | Low | Low | | | |

| Monitor | Place | | | | | |
|---|---|---|---|---|---|---|
| Assets | | Manage | Users | Settings | Reports | Uploads | Schedules |

Equipment
Equipment Types
Equipment Models
Inspection Checklists
Modules
Downloads Manage: Assets: Equipment Models: Equipment Model: Meter Settings
Meter Settings for 30TSPTN Version: 112 → 1
Meter: 114 → Hydraulic ▽
Updated by: Aaron Harshbarger
Last Update Time: 08/02/07 06:37 AM EDT     116
Associated Equipment: (3)                    118

[Back]

PRE-CONDITIONS
1 Key(15)

CONDITIONS
1 Seat Switch(22) AND HYD Index(32)
OR #2 Seat Switch(22) AND Trav. Left(23)
OR #3 Brakes(23) AND HYD Index(32)
OR #4 Brakes(23) AND Trav. Left(33)
OR #5 Brakes(23) AND Hydraulic A(28) AND Hydraulic B(29)
OR #6 Pivot(34) AND Brakes(23)
OR #7 Brakes(23) AND Trav. Right(35)
OR #8 Seat Switch(22) AND Hydraulic A(28) AND Hydraulic B(29)
OR #9 Seat Switch(22) AND Pivot(34)
OR #10 Seat Switch(22) AND Trav. Right(35)

EXCLUDE CONDITION
1

120

110

| Monitor | Place | Manage | Reports | | |
|---|---|---|---|---|---|
| Assets | | Users Settings Uploads Schedules | | | |

Equipment
Equipment Types
Equipment Models
Inspection Checklists
Modules
Downloads Manage: Assets: Equipment Models: Equipment Model: Meter Settings
Meter Settings for 30TSPTN Version: 2  — 112

Meter: [Usage ▾]

Updated By: Ted Fahrer — 114

Last Update Time: 08/14/07 09:06 AM EDT

Associated Equipment: (3)

PRE-CONDITION
1 — 116

CONDITIONS
1 KEY(15) — 118

EXCLUDE CONDITION
1 — 120

[Back]

INFORMATION SYSTEM FOR INDUSTRIAL VEHICLES

CROSS-REFERENCE TO RELATED APPLICATIONS

This application claims the benefit of U.S. Provisional Patent Application No. 61/166,494, filed Apr. 3, 2009, entitled INFORMATION SYSTEM FOR INDUSTRIAL VEHICLES; U.S. Provisional Patent Application No. 61/233,394 filed Aug. 12, 2009, entitled INFORMATION SYSTEM FOR INDUSTRIAL VEHICLES; and U.S. Provisional Patent Application No. 61/238,916, filed Sep. 1, 2009, entitled INFORMATION SYSTEM FOR INDUSTRIAL VEHICLES, the contents of each of which are incorporated herein by reference in their entirety. This application is a Continuation-in-Part of U.S. patent application Ser. No. 12/569,384 filed Sep. 29, 2009, entitled IMPACT SENSING USABLE WITH FLEET MANAGEMENT SYSTEM, which is a Continuation-in-Part of U.S. patent application Ser. No. 11/956,045 filed Dec. 13, 2007, entitled FLEET MANAGEMENT SYSTEM, which claims the benefit of U.S. Provisional Patent Application No. 60/869,845 filed Dec. 13, 2006, entitled FLEET MANAGEMENT SYSTEM, the contents of each of which are incorporated herein by reference in their entirety. This application is also a Continuation-in-Part of U.S. patent application Ser. No. 11/956,022 filed Dec. 13, 2007, entitled FLEET MANAGEMENT SYSTEM, which claims the benefit of U.S. Provisional Patent Application No. 60/869,845 filed Dec. 13, 2006, entitled FLEET MANAGEMENT SYSTEM, the contents of each of which are incorporated herein by reference in their entirety.

BACKGROUND OF THE INVENTION

Wireless strategies may be deployed by business operations, including for example, warehousing facilities, distribution centers, retail stores, manufacturing facilities, etc., to improve the efficiency and accuracy of business operations. Wireless strategies may also be deployed by such business operations to avoid the effects of constantly increasing labor and logistics costs. In a typical wireless implementation, workers are linked to a customized software application executing on a corresponding computer system via a mobile wireless transceiver, such as a hand-held device. The wireless transceiver may be used as an interface to the customized software application to direct workers in their tasks, e.g., by instructing workers where and/or how to pick, pack, put away, move, stage, process or otherwise manipulate the items within the operator's facility. The wireless transceiver may also be used in conjunction with a suitable input device to scan, sense or otherwise read tags, labels such as barcode labels or other identifiers to track the movement of designated items within the facility.

In order to move items about the operator's facility, workers often utilize industrial vehicles, including for example, forklift trucks, hand and motor driven pallet trucks, and/or other materials handling vehicles. However, disruptions in the operation of such industrial vehicles impact the ability of the management system and corresponding wireless strategy to obtain peak operating efficiency. Moreover, conventional enterprise software, including the above-described customized software applications, do not account for, track, communicate with or otherwise provide insight into the availability, health, status or suitability of the industrial vehicles to perform the required work. Still further, conventional enterprise software, including corresponding management systems do not provide tools to manage access to, and operation of, the available industrial vehicles within the facility in an efficient and integrated manner.

BRIEF SUMMARY OF THE INVENTION

According to various aspects of the present invention, systems of hardware and/or software, methods and computer program products are provided for enabling industrial vehicles and/or operators to communicate across a wireless environment. Moreover, aspects of the present invention comprise leveraging wireless communication, data collection and/or processing capabilities of industrial vehicles against robust software solutions to implement enterprise wide asset management functions, to integrate industrial vehicle data into existing enterprise workflows and/or to enable trusted third party integration into the enterprise for enhanced asset and/or workflow management. Still further, aspects of the present invention comprise leveraging wireless communication, data collection and/or processing capabilities of industrial vehicles with robust software solutions that aggregate and analyze data across multiple enterprises and/or promote the exchange of information between independent entities.

According to various aspects of the present invention, a method of tracking usage of an industrial vehicle may comprise utilizing a graphical user interface of a server application executing on a server computer to configure at least one parameter associated with at least one hour meter that is utilized for tracking usage of an associated feature of an industrial vehicle. For example, the graphical user interface may be used to customize parameters to track hour usage of at least one motor or control module of a corresponding industrial vehicle.

The application server may then wirelessly communicate each configured parameter to an associated industrial vehicle having a transceiver installed therewith, for receiving wirelessly communicated messages from the industrial vehicle application server. The method may then transform at least one hour meter on the industrial vehicle by programming each transformed hour meter to operate in accordance with at least the associated parameters wirelessly received from the industrial vehicle application server. Moreover, the method may comprise operating each programmed hour meter on the industrial vehicle to record usage of the associated feature based upon the wirelessly received parameters and providing a reading of each transformed hour meter to indicate usage of the associated feature.

In accordance with various aspects of the above method, utilization of a graphical user interface of the server application to configure at least one parameter associated with at least one hour meter may further comprise configuring at least one pre-condition associated with determining a triggering event to begin the accumulation of time by the associated hour meter, configuring at least one condition associated with the accumulation of time by the associated hour meter and/or configuring at least one exclude condition associated with the accumulation of time by the associated hour meter.

In accordance with further aspects of the above method, utilization of a graphical user interface of the server application to configure at least one parameter associated with at least one hour meter may further comprise utilizing the graphical user interface to associate parameters of an associated hour meter with a corresponding selected industrial vehicle from within a fleet of industrial vehicles.

The method of tracking usage of an industrial vehicle may further comprise wirelessly transmitting hour meter data back to the server application and querying the hour meter information stored by the server application to ascertain data regarding usage of the industrial vehicle.

According to further aspects of the present invention, a method of collecting information related to a lockout event occurring on an industrial vehicle comprises defining at least one lock out condition associated with an industrial vehicle, detecting an occurrence of the lockout condition by a processor executing on the industrial vehicle and locking out the industrial vehicle so that the industrial vehicle cannot be driven from its locked location. The method may further comprise wirelessly communicating a message to a server application that indicates that the industrial vehicle has been locked and displaying on a display screen of the industrial vehicle, an indication as to why the lockout condition occurred. The message may be displayed, for example, until the industrial vehicle is unlocked for operation.

In accordance with various aspects of the present invention, the method may further comprise, receiving a command to unlock the industrial vehicle, wirelessly transmitting to the server software, information that designates the identity of the person who unlocked the industrial vehicle and storing the identity of the person who unlocked the industrial vehicle in a database associated with the server application.

According to still further aspects of the present invention, a method of collecting information related to an impact event occurring on an industrial vehicle comprises defining at least one impact condition associated with an industrial vehicle, detecting an occurrence of the impact condition by a processor executing on the industrial vehicle and wirelessly communicating a message to a server application that indicates that the impact condition occurred on the industrial vehicle, wherein the message includes the location of the closest access point to the location of the industrial vehicle.

In accordance with various aspects of the above method, the impact event may cause the industrial vehicle to be locked out. Moreover, an alarm may be sounded in response to locking out the industrial vehicle, where the alarm may comprise initiating an audible alarm sound that is different from the horn of the locked out industrial vehicle. Alternatively and/or additionally, the alarm may comprise initiating a visual alarm that is different from the operating lights of the locked out industrial vehicle.

According to still further aspects of the present invention, a method of enabling an override to a normal login procedure for an industrial vehicle comprises providing a transceiver on an industrial vehicle, the transceiver configured for wireless data communication across a wireless computing environment to a server application, configuring a processor on the industrial vehicle to communicate with the transceiver for wireless communication across the wireless computing environment to a server application operating on a corresponding server computer and configuring the processor further to communicate with electronics components of the industrial vehicle across a vehicle network bus.

The method may further include requiring a login sequence for normal operation, comprising requiring an operator to log into the industrial vehicle using an authorized operator identification and requiring the operator to complete a vehicle inspection checklist. Still further, the method may include providing an override to the normal operation login sequence comprising communicating across the vehicle network bus to reduce functionality of at least one vehicle process and wirelessly communicating a message to the server application that indicates that the login override occurred on the industrial vehicle, wherein the message includes the location of the closest access point to the location of the industrial vehicle.

BRIEF DESCRIPTION OF THE DRAWINGS

The following detailed description of various embodiments of the present invention can be best understood when read in conjunction with the following drawings, where like structure is indicated with like reference numerals, and in which:

FIG. 4 illustrates an exemplary graphical user interface screen that may be provided in an industrial vehicle application server software application, for managing input/output pin settings of an information linking device installed on an industrial vehicle according to various aspects of the present invention;

FIGS. 5-7 illustrate exemplary graphical user interface screens that may be provided in an industrial vehicle application server software application, for setting up hour meters to record usage of industrial vehicles capable of data communication with the server software according to various aspects of the present invention.

DETAILED DESCRIPTION OF THE INVENTION

In the detailed description, reference is made to the accompanying drawings that form a part hereof, and in which is shown by way of illustration, and not by way of limitation, specific embodiments in which the invention may be practiced. It is to be understood that other embodiments may be utilized and that changes may be made without departing from the spirit and scope of various embodiments of the present invention.

System Architecture

Aspects of the present invention comprise systems that enable industrial vehicles, or mobile assets, to wirelessly communicate with one or more software applications, e.g., which may be deployed in an enterprise computing environment, and/or other remote computing systems, examples of which are described in greater detail herein. Exemplary industrial vehicles and mobile assets may include for example, forklift trucks, reach trucks, turret trucks, walkie stacker trucks, tow tractors, pallet trucks, and/or other materials handling vehicles.

Figure 1:
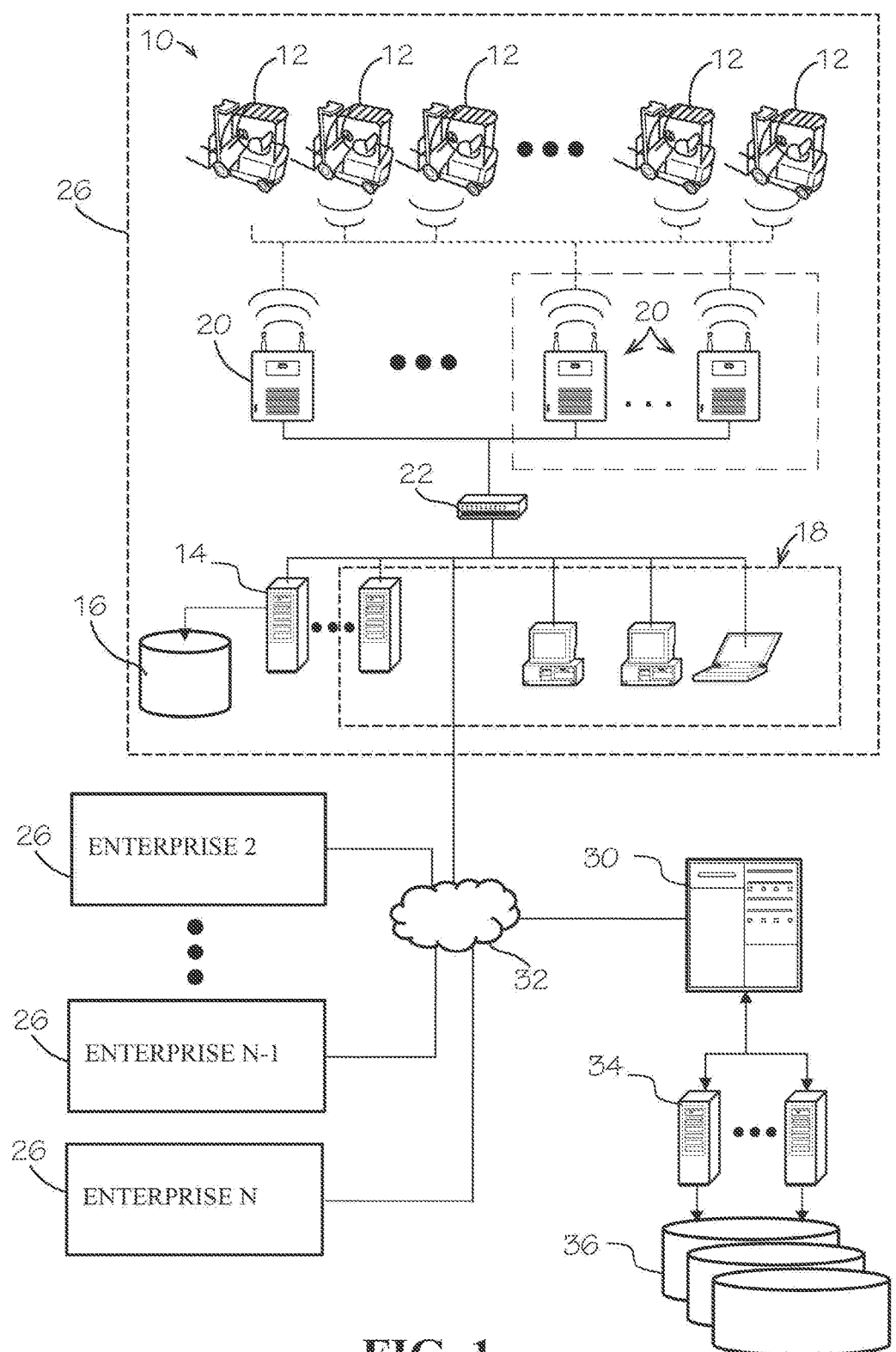
FIG. 1 is a schematic illustration of a wireless communication system that allows mobile assets, such as forklift trucks and other industrial vehicles to wirelessly communicate with a server.

Referring now to the drawings and particularly to FIG. 1, an exemplary computing environment 10 is illustrated, which includes components that support wireless communication capabilities. A plurality of mobile assets 12, (shown by way of illustration as a fleet of forklift trucks for convenience of discussion) wirelessly communicate with a processing device, such as an industrial vehicle application server 14. The industrial vehicle application server 14 may further interact with a data resource 16, e.g., one or more databases, data stores or other sources of information, to facilitate interaction with the mobile assets 12.

The computing environment 10 may further support additional processing devices 18, which may comprise for example, servers provided to execute other enterprise applications such as email, a warehouse management system (WMS), an Enterprise Resource Planning (ERP) application, etc.

The additional processing devices 18 may also comprise personal computers, notebook computers, transactional systems, appliance or pervasive computing devices such as personal data assistants (PDA), palm computers, cellular access processing devices, special purpose computing devices, network storage device and/or other devices capable of interacting with the computing environment 10. One or more of the processing devices 18 may also communicate with the mobile assets 12 and/or the industrial vehicle application server 14 across the computing environment 10.

The wireless communication architecture may be based upon a standard wireless fidelity (Wi-Fi) infrastructure, such as may be deployed using a standard 802.11 a/b/g wireless network communications protocol. In this regard, Wi-Fi certification may be obtained to demonstrate interoperability with other 802.11a/b/g products that may be utilized within the computing environment 10. Moreover, communication over the wireless network may utilize security encryption, such as may be implemented using WPA2-PSK, WPA2-MSCHAPv0, WPA2-TLS, and/or other standard or proprietary encryption techniques. However, any other suitable communication protocol and/or security techniques may alternatively be implemented.

In an exemplary arrangement, one or more wireless access points 20 may be utilized to relay data between a wireless transceiver of each mobile asset 12 and one or more wired devices of the computing environment 10, e.g., the industrial vehicle application server 14. The number of access points 20 and the placement thereof may be determined based upon the specific implementation. For example, in a relatively large site, e.g., a large warehouse, distribution facility, retail outlet, etc., numerous access points 20 may be required to provide wireless communications coverage across a designated area in which the mobile assets 12 are to be operated.

Moreover, the computing environment 10 may be supported by one or more networking components 22 that interconnect the various hardware and/or software processing devices, including for example, hubs, routers, firewalls, network interfaces and corresponding interconnections. The particular networking components provided in the computing environment 10 may thus be selected to support one or more intranets, extranets, local area networks (LAN), wide area networks (WAN), wireless networks (Wi-Fi), the Internet, including the world wide web, and/or other arrangements for enabling communication across the computing environment 10, either real time or otherwise, e.g., via time shifting, batch processing, etc.

The networking components 22 further allow integration of wireless capability of mobile assets 12 across an entire enterprise 26 of a fleet operator. As schematically illustrated, each enterprise 26 represents a computing system of an independent entity, such as a warehouse owner, retailer, distributor, manufacturer or other entity that operates a fleet of mobile assets 12. The fleet of mobile assets 12 associated with each fleet operator and correspondingly, each computer enterprise 26, may be maintained in a local computing environment 10 or the enterprise may be organized into a distributed enterprise architecture, for example, wherein several local computing environments are connected across a network, such as a LAN, WAN, the Internet, etc. Each local computing environment may represent, for example, one physical location, e.g., a warehouse, which collectively form a larger computing enterprise 26, where the enterprise 26 provides some form of common network control or supervision over the associated local computing environments.

For example, a fleet operator may have operations at multiple distinct physical site locations, yet the computing systems at each site are interconnected, capable of communication or are otherwise integrated. Under this configuration, each site may maintain its own industrial vehicle application server 14, or the enterprise 26 may manage each site 1-*n* from a centralized location. As such, the industrial vehicle application server 14 need not reside in the same physical location as the mobile assets 12. Rather, data links can be set up using combinations of access points 20 and networking components 22 to distribute the fleet of mobile assets 12 across the physical locations, e.g., multiple warehouse facilities of the entity enterprise.

In yet another exemplary implementation, one or more computing environments 10 and/or computing enterprises 26 may further communicate with a remote server 30, such as across a network 32, such as the Internet. The remote server 30 may comprise, for example, a third party server that interacts with the mobile assets 12, the industrial vehicle application server 14 and/or other processing devices 18 of the computing environment(s) 10/computing enterprise(s) 26. The remote server 30 may further interact with one or more back-end servers 34 and/or data resource 36, e.g., one or more databases, data stores or other sources of information.

Thus, the remote server 30 may interact with multiple computing enterprises 26, where each computing enterprise 26 may have one or more sites, e.g., local computing environments as described above. This allows, for example, a third party such as the manufacturer of the mobile assets 12 to electronically communicate with participating computer enterprises 26, including communications with select mobile assets 12, a select industrial vehicle application server 14, a select data resource 16 and/or other processing device 18 within a corresponding enterprise 26.

Depending upon the particular implementation, data processed, gathered, detected, monitored or otherwise wirelessly transmitted by mobile assets 12 may be locally maintained, e.g., at a particular site such as a local computing environment, e.g., as stored by an instance of the industrial vehicle application server 14. This data may also be shared across distinct physical sites of a larger computing enterprise 26. Still further, this data may be shared between sites/enterprises 26, etc., and remote server(s) 30, which may be maintained by a trusted third party, such as an industrial vehicle manufacturer, or multiple trusted third parties.

Conceptually, at least three general classes of interface may be provided for interacting with the wireless communication systems illustrated in FIG. 1. The first class of interface is provided at a mobile asset 12. The second class of interface is provided at an intra-enterprise fixed location and the third class of interface is provided at an inter-enterprise location.

An "intra-enterprise fixed location" corresponds to a fixed location processing device (not installed on a mobile asset 12) that is under the control and/or supervision of an entity associated with a corresponding enterprise 26. As an example, the second (intra-enterprise) class of interface may be implemented by a software client that is executed on a personal computer, laptop, etc., within a corresponding local computing environment 10 or is otherwise part of the enterprise 26, which is logged into the mobile asset application server 14. The software client may alternatively be logged into a processing device 18, such as a warehouse management system application that interacts with one or more mobile assets 12 and/or the mobile asset application server 14, etc.

An "inter-enterprise" location corresponds to a remote location outside the control/supervision of a computing environment 10 or associated enterprise 26. For example, a third (inter-enterprise) class of interface may be implemented by a software client that is executed on a remote location processing device, such as a personal computer, laptop, etc., logged into the remote server 30, which may be operated by a trusted third party, such as an equipment manufacturer. The inter-enterprise interface may enable interaction with data stored in a corresponding data resource 34, which was obtained via communication with one or more mobile asset information servers 14 and/or mobile assets 12 from one or more enterprises 26. The inter-enterprise interface may also/alternatively enable interaction between the remote server 30 and one or more of the mobile assets 12 or the mobile asset application servers 14 across one or more corresponding computing environments 10/enterprises 26. A Web-browsing style of client may be utilized to implement one or more of the various classes of interface.

The role of the user at a particular interface may influence how that user interacts with the system according to various aspects of the present invention. For example, an enterprise user who wishes to interact with the system at a mobile asset interface may assume the role of a mobile asset operator, an intra-enterprise authorized user who may not be the asset operator, such as a supervisor/manager, an information technology support person, a mechanic/service person, etc. Likewise, a third party user may access the system via a mobile asset interface, such as when implementing the role of an asset/component/accessory/peripheral supplier or manufacturer, technician, support person, sales representative, etc. Each user may have different needs, goals, capabilities, limitations and requirements when interacting with the wireless communication system from the mobile asset interface, examples of which are described herein.

Likewise, an enterprise user at an intra-enterprise fixed location interface of the wireless communication system, e.g., a user at a computer logged into a corresponding mobile asset application server 14, may implement any number of roles, including for example: an intra-enterprise authorized user, such as a supervisor/manager; an information technology administrator or support person; a mechanic/service person; an asset operator who is not currently operating a mobile asset, etc. Again, each user may have different needs, goals, capabilities, limitations and requirements when interacting with the wireless communication system from the intra-enterprise fixed location interface.

The inter-enterprise (remote) interface may be utilized, for example, by a trusted third party, such as an asset manufacturer, supplier, maintenance provider, sales representative, etc. Similarly, asset component and asset peripheral manufacturers, suppliers, maintenance providers, sales representatives, etc., may also interact with the wireless communications system, e.g., via an inter-enterprise remote interface. Whether or not an inter-enterprise remote interface/remote server 30 can interact with a particular enterprise 26 will likely depend upon the specific implementation of the various aspects of the wireless communications system described in greater detail herein.

The Vehicle Interface

Figure 2:
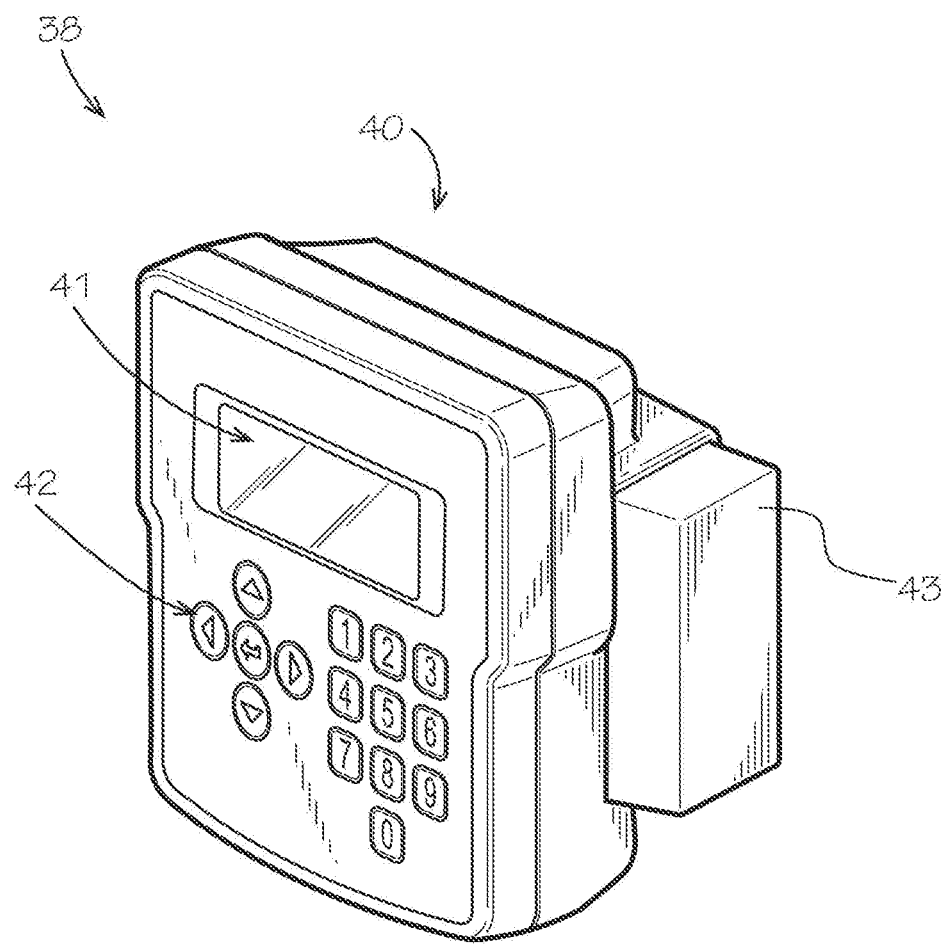
FIG. 2 is an illustration of an information linking device capable of wirelessly communicating data between an industrial vehicle and a corresponding server.

Referring to FIG. 2, an exemplary information linking device 38 is illustrated that provides the wireless interface to the mobile assets 12. The information linking device 38 may also serve as an interface that facilitates interaction with the user at the mobile asset 12, and is enabled by hardware and software. The illustrated information linking device 38 includes, in general, an antenna 40 that couples to a transceiver for wireless communication. The antenna 40 may be internal to the information linking device housing, or the antenna 40 may comprise a detachable or permanently installed external antenna. Moreover, the antenna 40 may be implemented as two or more antennae, e.g., a twin antenna configuration so as to implement dual diversity capabilities.

The information linking device 38 may also include a display 41 and controls 42 for interacting with a user. The information linking device 38 may further include additional features, such as a reading device 43, e.g., a proximity reader or other device for electronically obtaining operator login information. Operator login procedures are described in greater detail herein.

In addition to the information linking device 38 being a separate component that can be coupled with a mobile asset 12, the information linking device 38 may alternatively be integrated with (e.g., built into or otherwise connected with or to) a corresponding mobile asset 12. As an example, the information linking device 38 may be integrated into a work area, e.g., a console of an operator's compartment. Regardless of whether the information linking device 38 is attached to an existing mobile asset 12 or built into a corresponding mobile asset 12, the features of the information linking device 38, described more fully herein, can be in communication with other existing vehicle features and functions.

Within a given computing enterprise 26, site 10, or other suitable computing environment, each information linking device 38 is assigned or otherwise derives a unique identifier that is known or made known to the corresponding industrial vehicle application server 14. Thus, using the known identifiers, the industrial vehicle application server 14 may conduct targeted communications with specific industrial vehicle information linking devices 38, or broadcast information to groups or all of the industrial vehicle information linking devices 38 that are associated with that industrial vehicle application server 14.

According to an aspect of the present invention, to initiate communication between the industrial vehicle application server 14 and an information linking device 38, an acknowledgment sequence is implemented. For example, the industrial vehicle application server 14 may listen for information linking device(s) 38 to identify themselves as being available for communication with the industrial vehicle application server 14. Alternatively, the industrial vehicle application server 14 can send out a request or ping a specific information linking device 38 on a mobile asset 12. If the pinged information linking device 38 responds, an exchange of information between the information linking device 38 and the industrial vehicle application server 14 may occur.

According to various aspects of the present invention, the industrial vehicle application server 14 may be used to store, maintain, distribute, host or otherwise deploy wireless security settings to the information linking device 38. By way of illustration, the industrial vehicle application server 14 may push security and/or other features to the information linking device 38, e.g., so as to avoid manual entry of the security feature(s) directly from the interface of the information linking device 38, e.g., the display 41 and controls 42.

Figure 3:
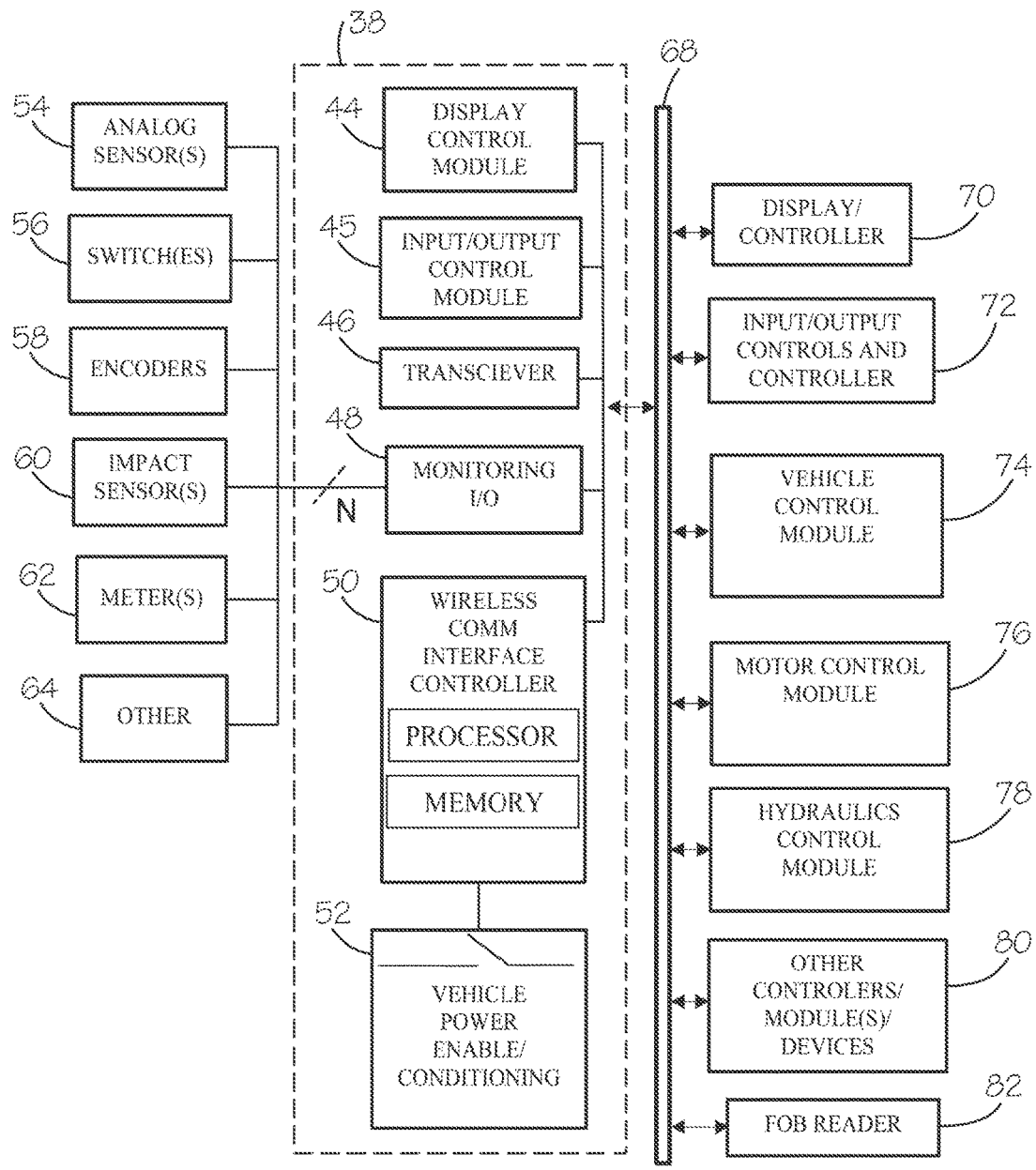
FIG. 3 is a block diagram of an information linking device and corresponding vehicle features according to various aspects of the present invention.

Referring to FIG. 3, a block diagram illustrates select features of an exemplary implementation of an information linking device 38 that has been coupled to or integrated with a corresponding mobile asset 12. The illustrated information linking device 38 comprises a display control module 44 for controlling the display 41 and an input/output control module 45 that is associated with the controls 42. The information linking device 38 further comprises a transceiver 46, a monitoring input/output module 48, a wireless communications interface controller 50 and vehicle power enabling/conditioning circuitry 52.

The transceiver 46 may provide, for example, two-way wireless communication with processing devices, including server computers such as the industrial vehicle application server 14 across the corresponding computing environment. The monitoring input/output module 48 may be utilized to receive sensor and control inputs and/or to control outputs such as horns, buzzers, lights and other asset components and/or devices. As just a few exemplary illustrations, the monitoring input/output module 48 may interface with analog sensors 54, switches 56, encoders and other similar input devices 58, impact sensor(s) 60, meter input(s) 62 and any other analog or digital inputs and/or outputs 64 to integrate such information into the wireless communications system. The monitoring input/output module 48 allows data logging capabilities which can be used, for example, to monitor travel usage meters, hydraulic usage meters, steering usage meters, operator usage meters, miscellaneous sensor inputs and other types of asset related data.

Information detected by the monitoring input/output module 48 may be temporarily stored, collected, maintained, manipulated and/or otherwise processed, e.g., by a processor and corresponding memory in the interface controller 50 or other suitable processor and memory, which may be provided as part of the vehicle electronics. Further, the collected information may be communicated to a corresponding industrial vehicle application server 14, for example, using the transceiver 46.

The interface controller 50 may comprise a suitable processor, memory, software, resident firmware, etc., to control the functions of the information linking device 38. Moreover, the processor of the interface controller 50 may be configured to communicate with the transceiver 46 for wireless communication across the wireless computing environment to a corresponding server computer, e.g., the industrial vehicle application server 14. The power enabling circuitry 52, where applicable, allows power to be provided to the information linking device 38, even when the corresponding mobile asset 12 is powered down. Moreover, the power enabling circuitry 52 can be tied to the vehicle ignition to prevent industrial vehicle startup unless certain conditions are met, or to force the industrial vehicle to shut down, as schematically represented by the switch shown within box 52. As an example, industrial vehicle startup conditions may be evaluated by the interface controller 50 of the information linking device 38 or other suitable processor before allowing the mobile asset 12 to be powered up and fully functional for operation.

In an illustrative implementation where a mobile asset 12 comprises for example, a forklift truck, the components of the information linking device 38 may be coupled to and/or communicate with other industrial vehicle system components via a suitable industrial vehicle network system 68, e.g., a vehicle network bus. The industrial vehicle network system 68 is any wired or wireless network, bus or other communications capability that allows electronic components of the mobile asset 12 to communicate with each other. As an example, the industrial vehicle network system 68 may comprise a controller area network (CAN) bus, ZigBee, Bluetooth, Local Interconnect Network (LIN), time-triggered data-bus protocol (TTP) or other suitable communication strategy. Utilization of the industrial vehicle network system 68 enables integration of the components of the information linking device 38 into the native electronics including controllers of the mobile asset 12 and optionally, any electronics peripherals associated with the mobile asset 12 that integrate with and can communicate over the network system 68.

Thus, as an example, a processor provided on an industrial vehicle, e.g., as provided within the interface controller 50 or otherwise integrated into the industrial vehicle, may be configured to implement at least one function by wirelessly communicating with the application server via the transceiver 46 and by interacting with at least one component of the industrial vehicle across the vehicle network bus, such as by communicating with at least one native control module 70, 72, 74, 76, 78, 80, 82 of the industrial vehicle across the vehicle network system 68. Integration is further achieved where the event codes and other communications across the vehicle network bus are well understood by the information linking device 38, thus enabling interaction between the industrial vehicle application server 14, the information linking device 38 and the industrial vehicle at the machine component level.

For example, the processor provided within the interface controller 50 or otherwise integrated into the mobile asset 12 may communicate configuration information from the industrial vehicle application server 14 to at least one component of the mobile asset 12 across the vehicle network bus. The processor provided within the interface controller 50 or otherwise integrated into the mobile asset 12 may also and/or alternatively receive operational information from one or more components of the mobile asset 12 across the vehicle network system 68 that is conveyed to the industrial vehicle application server 14. The processor may also filter, manipulate or otherwise process information communicated across the vehicle network bus/vehicle network system 68.

As another example, the information linking device 38 may communicate with input/output controls and corresponding I/O controller 72, such as for controlling switches, buttons, levers, handles, pedals, etc., that are assigned to functions of the industrial vehicle. The information linking device 38 may also communicate with a vehicle control module (VCM) 74 that controls the electronic capabilities of the industrial vehicle, a motor control module 76 that controls the drive wheels of the vehicle, a hydraulics control module 78 that controls the hydraulics, e.g., the lift of the vehicle, and any other controllers/modules and other electronics 80 that are associated with the industrial vehicle. Still further, the information linking device 38 may communicate with other miscellaneous devices such as a keyless entry fob reader 82 or any other devices that are attached to the mobile asset 12.

The controllers/modules and other electronics 80, 82 may also include scanning technologies such as bar code scanners, RFID and other tag reading technologies, hardware for supporting warehouse management systems and other enterprise software, printers and other output devices as well as other technologies that an operator may currently utilize as separate components.

As an alternative to communication over the network system 68, components may be communicably coupled to the information linking device 38 via one of the inputs and/or outputs 64 coupled to the monitoring input/output module 48 or via other suitable input to the interface controller 50, such as where a given separate component, e.g., a tag reader, cannot communicate across the CAN bus or other suitable vehicle network system 68 of the mobile asset 12.

Regardless of whether various components communicate over the network system 68, e.g., vehicle components, or via the inputs and/or outputs 64 of the information linking device 38, the various components of the mobile asset 12, e.g., the I/O controller 72, the VCM 74, motor control module 76, hydraulics control module 78 and other controllers 80 can be included in an enterprise infrastructure by utilizing the information linking device 38 to merge all information flowing into or out of the mobile asset 12 into a wirelessly communicated data stream(s) that interacts with other enterprise resources.

According to various aspects of the present invention, certain parameters of I/O may be customized. For example, referring to FIG. 4, a graphical user interface screen shot 100 illustrates a management screen for setting up and/or managing I/O settings, e.g., which may affect the monitoring I/O module 48. In practice, the software can take other and/or alternative organizational approaches and need not include tabbed views as illustrated. Moreover, the logical/hierarchical and other organizational mechanisms provided for organizing the data displayed by the server software can vary from that shown.

As illustrated, the industrial vehicle application server 14 may be utilized to monitor and/or configure certain pin assignments of the monitoring I/O module 48 provided on each mobile asset 12. As such, each mobile asset 12 may be custom configured to accommodate particular monitoring needs. Moreover, according to various aspects of the present invention, changes may be implemented from the server software. For example, using a graphical user interface screen such as that illustrated in FIG. 4, an operator of the industrial vehicle application server 14 may be able to turn I/O pins on or off at 102, name I/O pins at 104 and/or dynamically adjust parameters and functions implemented by the pins at 106. Once the data is adjusted within the software, the settings may be communicated wirelessly to the corresponding mobile asset 12 for configuration thereof.

Various aspects of the present invention may further exploit other devices, systems, architectures, etc. as described more fully in patent application Ser. No. 11/956,022 (Published as US 2008-0154712 A1) entitled "Fleet Management System", filed Dec. 13, 2007, which is hereby incorporated by reference in its entirety. The present application may also further exploit other vehicle interface features as described more fully in patent application Ser. No. 11/956,045 (Published as US 2008-0154691 A1), entitled "Fleet Management System" also filed Dec. 13, 2007, which is also hereby incorporated by reference in its entirety.

Data Collection

Information detected by the monitoring input/output module 48 or otherwise obtained by accessing the network system 68 may be temporarily stored, collected, maintained, manipulated and/or otherwise processed, e.g., by a processor and corresponding memory in the interface controller 50 or other suitable processor and memory, which may be provided as part of the industrial vehicle electronics. Further, the collected information may be communicated to the industrial vehicle application server 14, for example, using the transceiver 46. Thus, the information linking device 38 may be used to facilitate the coupling of data logging from the mobile asset 12 to the industrial vehicle application server 14. This approach can be used to create a history of operational data that may vary over time, such as speed, temperature, battery state of charge, proprietary service codes, height, weight and other measurable parameters.

Moreover, data can flow from the industrial vehicle application server 14 to the processor in the interface controller 50 of the information linking device 38 via the transceiver 46. Still further, the processor 50 on the vehicle may be configured to implement special processing based upon parameters defined by the industrial vehicle application server 14, e.g., to collect special types of data, to collect data only under specific instances, to require the vehicle to implement certain defined functions, etc.

As an example, the exchange of information across the vehicle network system 68 of an industrial vehicle may be monitored. Part of the functionality that may be provided as part of the industrial vehicle electronics is the detection or recognition of different events associated with the mobile asset 12 or subcomponents of the industrial vehicle (e.g., occurrence of an impact to the vehicle, hydraulics control module status, vehicle control module status, etc.). If a predetermined event associated with the mobile asset 12 is detected, the processor provided within the interface controller 50 or otherwise integrated into the mobile asset 12 may be configured to implement a function in response to detecting the predetermined event. That implemented function can include wirelessly communicating information associated with the event between a server computer, e.g., the industrial vehicle application server 14 and the mobile asset 12 via the transceiver 46. The processor of the interface controller 50 may also interact with at least one component of the mobile asset 12 across the vehicle network system 68 in response to the event to implement the function.

Thus, the data collection capabilities of the information linking device 38 may be utilized to implement event driven data archival activities. For example, the detection of a predetermined event may trigger the processor of the interface controller 50 to begin logging certain data, end logging certain data, archive a predetermined window of collected data and/or otherwise perform other prescribed operation(s). The information linking device 38 may also continually or periodically monitor certain vehicle parameters. If all monitored parameters are within prescribed tolerances, such logged data may be subsequently summarized, deleted, sent to the industrial vehicle application server 14, etc.

Operator Authorization

The wireless communication system may be utilized to facilitate industrial vehicle operator authorization and/or operator license/certification management. Under this arrangement, the industrial vehicle operator is required to accomplish a valid login before a corresponding mobile asset 12, e.g., a forklift truck, may be operated. In order to successfully log onto the mobile asset 12, the login operation may consider any number of factors, conditions and circumstances.

For example, before a user can log onto the mobile asset 12, e.g., a forklift truck, the user must be included in a list of authorized users associated with that mobile asset 12 (a forklift truck in the current example). The list of authorized users may be provided to the mobile asset 12 by the mobile asset application server 14, which builds, modifies, maintains or otherwise supports the authorized user lists. The mobile asset application server 14 may build or modify lists based upon a manually initiated process, or the mobile asset application server 14 may periodically build or modify authorized user lists, such as based upon the detection of predetermined events including changes in the status of operators, mobile assets, etc., based upon predetermined intervals, or based upon other conditions or circumstances.

To build a list of authorized users for the mobile asset 12, the mobile asset application server 14 may process through a list of operators, such as may be maintained in a database, table or other suitable format stored within the data resource 16 associated with the mobile asset application server 14. For example, the application server 14 may consider each user from a list of users, such as be examining the next user in a list of users. In order to be an authorized user for a given mobile asset 12, an operator may be required to meet certain predetermined requirements and/or conditions.

For example, the mobile asset application server 14 may consider factors such as the location of the mobile asset in determining whether a given user should be considered an authorized user for a corresponding mobile asset. As an example, a warehouse may include a bonded area that a given user may not have authorization to work in. If a corresponding mobile asset 12 is located in the bonded area, then the user may not be an authorized user. Alternatively, if the same mobile asset is outside the bonded area, then the user may be an authorized user. As another example, a user may not be authorized to drive a forklift truck on a loading dock. Accordingly, that user may be an authorized user, unless the corresponding mobile asset is on the loading dock. Alternatively, there may be multiple sites within an enterprise, and a user may only be authorized at a specific site location. Thus, a user that is authorized to operate a forklift truck at site 1 may not be authorized to operate the same forklift truck or same type of forklift truck at other sites.

As still further examples, a user may be authorized to operate only specific types, classes, etc., of mobile assets 12. As an example, a user may be authorized to operate sit-down counter balanced forklift trucks, but not rider reach trucks. Accordingly, that user may be an authorized user only in lists associated with sit-down counter balanced forklift trucks. Still further, a user may be authorized only for specific mobile assets within a given type or class of mobile asset. As an example, a user may only be authorized to operate a specific forklift truck, which is identified by a specific unique identifier such as a serial number. Accordingly, that user would only be an authorized user for a list associated with the corresponding forklift truck having the associated serial number. Other factors, such as time, day, date, etc., may also be considered. For example, the end of a work shift could automatically trigger a workflow that causes the mobile asset application server 14 to build a new list of authorized asset users for select (or all) mobile assets 12 having authorized user lists corresponding to users working the new shift. This updated list can then be automatically communicated to the corresponding mobile assets 12. As yet a further example, lists of authorized users may be adjusted based upon obtained/updated certifications, training, etc.

Also, a check can be performed to ascertain whether any license(s)/certificate(s) for that authorized user are required, and if required, whether they are still valid. In this regard, the mobile asset application server 14 may maintain a license/certification file that tracks licenses/certifications and their expiration dates (or range of valid dates) for each user. Accordingly, the server software may verify that each operator's licenses/certifications are valid (where applicable) by consulting the appropriate file(s). If a select user is an otherwise authorized user, but their license(s)/certification(s) have expired, a suitable workflow may be triggered such as by sending an e-mail notification or otherwise generating a notice of the license/certificate expiration. Further, the operator having the expired (or nonexistent) license or certification may be excluded from the updated list of authorized users. In this regard, the application server 14 may further monitor license/certificate expiration dates and trigger workflows such as for license/certificate renewal where the expiration date is within a predetermined range of dates so that appropriate actions can be taken to avoid such expirations.

As an alternative, the wireless communications interface controller 50 of the mobile asset information linking device 38 of the mobile asset 12 may, from time to time, communicate with the mobile asset application server 14 to request updates of its list of approved asset operators. Still further, the mobile asset information linking device 38 may receive new authorized user lists that replace the existing authorized user list, or the mobile asset application server 14 may communicate only the changes to the corresponding authorized user list, in which case, the wireless communications interface controller 50 may modify its currently stored authorized user list based upon the data received from the mobile asset application server 14. Notably, in one exemplary implementation, the mobile asset 12 only stores a list of authorized users, despite the fact that the mobile asset application server 14 may have considered numerous factors in determining who those authorized users are for that mobile asset.

At some point after the mobile asset 12 has been programmed with a list of authorized users, an operator may be required to provide an operator identification. Accordingly, the operator may present login information, such as by entering a personal identification number (PIN) or other suitable login information. The login information can be entered, for example, using controls 42 that interact with the input/output control module 45. The login information received by the input/output control module 45 is communicated to the interface controller 50, where it can be processed against the list of authorized users stored, for example, in the memory of the interface controller 50.

As an alternative, the operator may utilize a fob that interacts with the device reader 43, or the operator may present a keyless entry fob that interacts with the fob reader 82 (if provided). Under this configuration, the fob reader 82 communicates the login information to the interface controller 50, such as across the CAN bus or other mobile asset network system 68, via an input 64 coupled to the monitoring input/output module 48 of the mobile asset information linking device 38 or via other suitable input to the interface controller 50. Still further, other techniques, including biometric input technologies may be utilized to communicate login information to the interface controller 50.

When a login is received, the interface controller 50 verifies whether the presented login information identifies an operator that is authorized to operate the forklift truck. For example, the interface controller 50 may compare the received identification information, such as an operator ID, against the list of authorized user Operator IDs communicated to the mobile asset 12 by the application server 14. The interface controller 50 may further timestamp and record the attempted login, regardless of whether the login attempt was successful or failed. If the login attempt failed, the interface controller 50 may provide an error message, such as by writing a suitable message to the display 41. The failed login attempt may also be recorded for purposes of data logging. At some convenient time, the mobile asset 12 communicates the operator identification information and timestamp for successful (and optionally for failed) login attempts to the application server 14. For example, a login attempts file or other data file can be transmitted from the mobile asset 12 to the application server 14.

As noted above, the mobile asset application server 14 keeps track of each mobile asset user and the corresponding mobile assets that each user is authorized to operate. Authorization by the mobile asset application server 14 may be contingent upon a user having one or more valid (non-expired) license/certification, or based upon any number of other factors, including asset location, asset class/type, asset serial number, day, time, date and other factors. As yet a further example, mobile assets may be allocated to specific areas, locations, tasks or other criteria and users may be authorized to those mobile assets only if the user is also associated with the same criteria.

Further, positioning and other technologies may be utilized by the mobile asset application server 14 to determine the location of a mobile asset 12 so as to be able to evaluate the associated criteria as the application dictates. Thus, even for the same mobile asset 12, an operator may be authorized under a first set of conditions and not authorized under a different set of conditions. As an alternative to the above, decision logic, e.g., environmental conditions, location, time, etc., may be evaluated by the interface controller 50 or other processing logic of the mobile asset 12 or the information linking device 38, or the decision logic may be shared between the application server 14 and/or processing capabilities of the mobile asset 12.

If the license/certification for an asset operator expires, as is tracked by server software controlled by the mobile asset application server 14, then the mobile asset application server 14, at a suitable time, updates the list of authorized users corresponding to the affected mobile assets. This may automatically disable the asset operator's access to the affected mobile assets upon the detected expiration of the license/certificate and the associated updating of the authorized users at the corresponding mobile asset information linking device 38 of the corresponding mobile asset 12.

As noted above, the application server 14 may build authorization lists based upon operator ID, mobile asset ID/grouping and license/certification/training and other appropriate conditions. Once the application server 14 determines the list, only the corresponding operator IDs need to be wirelessly communicated to each corresponding mobile asset. Thus, at the mobile asset side, the only necessary parameter may be whether or not the operator ID is present in its local list of authorized users.

Once logged into the mobile asset 12, the asset operator may be able to operate the mobile asset 12 as necessary, or further procedures may be required, such as the completion of a checklist as described herein. Even though an operator is successfully logged into a mobile asset 12 for operation, the wireless communications interface controller 50 may automatically log that operator off, e.g., where asset monitored activities have been idle for a specific period of time or where it has been determined that the operator exited the vehicle.

Numerous techniques may be used to detect operator exit. For example, the system can monitor fraction, hydraulics and other mobile asset parameters and determine periods of inactivity. Additionally, sensors may be provided on the seat and/or other appropriate locations on the mobile asset that may be used to determine whether or not the operator is still on the mobile asset.

Moreover, the wireless communications interface controller 50 may be programmed, e.g., from the mobile asset interface, such as by using controls 42 or from the mobile asset application server 14, to allow a mobile asset 12 to be temporarily "locked" for a specific amount of time. For example, an asset operator may temporarily lock a mobile asset 12 to reserve that asset prior to the asset operator being ready for immediate asset usage. As another example, a mobile asset may be temporarily locked, e.g., by a supervisor or maintenance person to designate the asset as being unavailable.

Pre-Use Inspection Checklist

An inspection may be desired or required, such as before using a mobile asset 12 or at other appropriate times. In an illustrative implementation, after an operator successfully logs into a mobile asset 12 as described more fully herein, the operator is required to complete a checklist having a plurality of checklist items before the system determines whether to enable the mobile asset 12 for normal operation, e.g., by presenting a series of checklist items to the operator via the display 41 or other vehicle display, verbally or otherwise. The operator may respond to the checklist items and record the appropriate results via the controls 42 provided on the industrial vehicle information linking device 38.

The mobile asset 12 may be locked out from operation or reduced in functionality of operation as a result of one or more answers provided to the checklist. Moreover, a lockout may remain in force until a determination has been reached that the mobile asset 12 is in proper operating condition.

Checklist Override Sequence

Situations may arise where there is not enough time to complete an entire log in a checklist procedure. Situations may further arise where there is no need to run through the checklist, e.g., where the vehicle is being moved for servicing or to move the vehicle for non-operational reasons. In this regard, a predetermined login sequence may be implemented where the operator is not required to step through the checklist procedure. For example an override code, such as "811" may be established so that the mobile asset 12 becomes fully operational and functional upon login only. Under this arrangement, the mobile asset 12 may have a predefined timeout where it is only operational for a predetermined period of time or, other appropriate terminating events may be triggered to limit the scope of the override. Additionally, vehicle functionality may be limited by the override, e.g., operation may be limited to steering and traction control, etc. The override may be provided, for example, where a time sensitive operation must be performed, such as moving the mobile asset 12.

According to further aspects of the present invention, when the override code is used to unlock the mobile asset 12, a message may be communicated to the industrial vehicle application server 14. The message may include any additional information, such as may be gathered by the mobile asset 12. Moreover, location based data may also be communicated to the industrial vehicle application server 14. By way of example, the message to the server may include the location of the access point 20 closest to the vehicle where the override sequence was used. Other data, such as location based upon GPS, RFID tags and/or other sensing technologies may also and/or alternatively be utilized. Still further, access point triangulation and/or other computational methods may be utilized to locate or approximate the location of the locked vehicle.

Impact Sensing

Depending upon the mobile asset 12, it may be desirable to implement customizable impact detection and appropriate post impact actions, such as lockout operations. For example, with reference to FIG. 3, in some embodiments of the invention, the interface controller 50 may track minor impacts using appropriate impact sensors 60 and a corresponding monitoring input/output module 48.

Thus, if a predetermined event comprises detecting an impact on a mobile asset 12, the processor, e.g., provided by the interface controller 50 or otherwise integrated into the mobile asset 12 may be configured to respond to the detected impact by classifying the severity of the detected impact and by wirelessly communicating impact information to the server computer if it is determined that the detected impact exceeds at least one predetermined impact condition.

In an illustrative example, the interface controller 50 may compute or otherwise analyze the "severity" of impacts, such as to distinguish between minor impacts and major impacts. One strategy may be to lock out the industrial vehicle upon detecting a major impact and/or detecting a predetermined number of minor impacts.

Upon a detected impact that exceeds predetermined impact conditions, an impact notification, e.g., alarm, such as a buzzer, horn or light may be activated, e.g., via the monitoring input/output module 48 until a supervisor clears the alarm. A message may also be communicated to the industrial vehicle application server 14 so that an appropriate action may be taken. In this regard, the alarm, e.g., a flashing light or audible alarm used to designate an impact may be provided as a separate kit or add/on that integrates with the information linking device 38 so that the alarm is readily distinguishable from normal functionality of the mobile asset 12 including vehicle lights, horn, etc.

By way of example, an add-on alarm and light may be mounted to the mobile asset 12. The alarm and light may be further electrically coupled to the information linking device 38, e.g., via the monitoring I/O module 48. Still further, the server software, e.g., as illustrated and described herein with reference to FIG. 4, of the industrial vehicle application server 14, may be utilized to customize and configure the pins in the monitoring I/O module 48 to operate the alarm and lights. Alternatively, the alarm and lights may be configured from the information linking device 38.

Under certain situations, the mobile asset 12 may be shutdown, disabled or otherwise stopped. The mobile asset 12 may also be able to distinguish a low threshold impact as noted above, in which case, the tracking of minor incidences may be simply logged/recorded without initiating an alarm. Still further, as noted above, the system may be configured to allow a predefined number of low threshold impacts within a predefined set of parameters. For example, if an operator within a single shift experiences a number of impacts having thresholds that exceed the low impact threshold, and that number of impacts exceeds a predetermined number of low impacts deemed acceptable, suitable responsive actions may be implemented, e.g., by initiating an impact notification.

Regardless of the reason for locking out the mobile asset 12, a message may be communicated to the industrial vehicle application server 14. The message may include any additional information, such as may be gathered by the mobile asset 12. Moreover, location based data may also be communicated to the industrial vehicle application server 14. By way of example, the message to the server may include the location of the access point 20 closest to the mobile asset 12 where the impact lockout occurred. As with the above example, other data, such as location based upon GPS, RFID tags and/or other sensing technologies may also and/or alternatively be utilized. Still further, triangulation of multiple access points 20 and/or other computational methods may be utilized to locate or approximate the location of the locked vehicle.

Lockout

As noted above, there are several events that can cause a mobile asset 12 to be locked out. As a few illustrative examples, the mobile asset 12 may have failed its checklist, or some problem during the checklist procedure may have triggered a lockout. The mobile asset 12 may have also been locked out as a result of an impact. As a few other illustrative examples, the interface controller 50 may be programmed, e.g., from the interface of the information linking device 38, such as by using controls 42 or from the industrial vehicle application server 14, to allow a mobile asset 12 to be temporarily "locked" for a specific amount of time. For example, an operator may temporarily lock a mobile asset 12 to reserve that vehicle prior to the operator being ready for immediate usage. As another example, an industrial vehicle may be temporarily locked, e.g., by a supervisor or maintenance person to designate the vehicle as being unavailable. Again, however, situations may arise where it becomes necessary to access the locked mobile asset 12.

In response to a lockout condition, an authorized person may be required to unlock to vehicle, e.g., either from the industrial vehicle application server 14, or from the mobile asset 12. However, a supervisor may not be around or otherwise have access to data stored by the industrial vehicle application server 14 that describes the lockout condition. However, according to aspects of the present invention, the display 41 of the information linking device 38 can provide a display message that indicates information related to the lockout condition. For example, the display 41 may contain an explanation or coded representation of the reason why the lockout occurred. Thus, a supervisor that approaches a mobile asset 12 that has been locked out can obtain sufficient information about the reason for the lockout to take an appropriate action.

In this regard, the system may further record the supervisor, a time stamp and other desired information to designate who the supervisor is that released the mobile asset 12 from its locked state.

Hour Meters

Hour meters provide a convenient mechanism for the assessment of usage of the vehicle. According to various aspects of the present invention, the industrial vehicle application server 14 may interact with the mobile assets 12 to ascertain hour meter data. According to further aspects of the present invention, each mobile asset 12 may be able to record and report multiple hour meter metrics to the industrial vehicle application server 14. As a few illustrative examples, the mobile assets 12 may implement a manufacturer specific time hour meter, an odometer hour meter, a traction system hour meter, a travel usage hour meter, a hydraulic usage hour meter, a steering usage hour meter, operator usage hour meter, etc. In this regard, the actual number of hour meters may vary from product to product based, for example, upon vehicle features that include a motor, control module, sensor or other characteristic that is of interest to monitor, e.g., from a time-based perspective.

Figure 7:
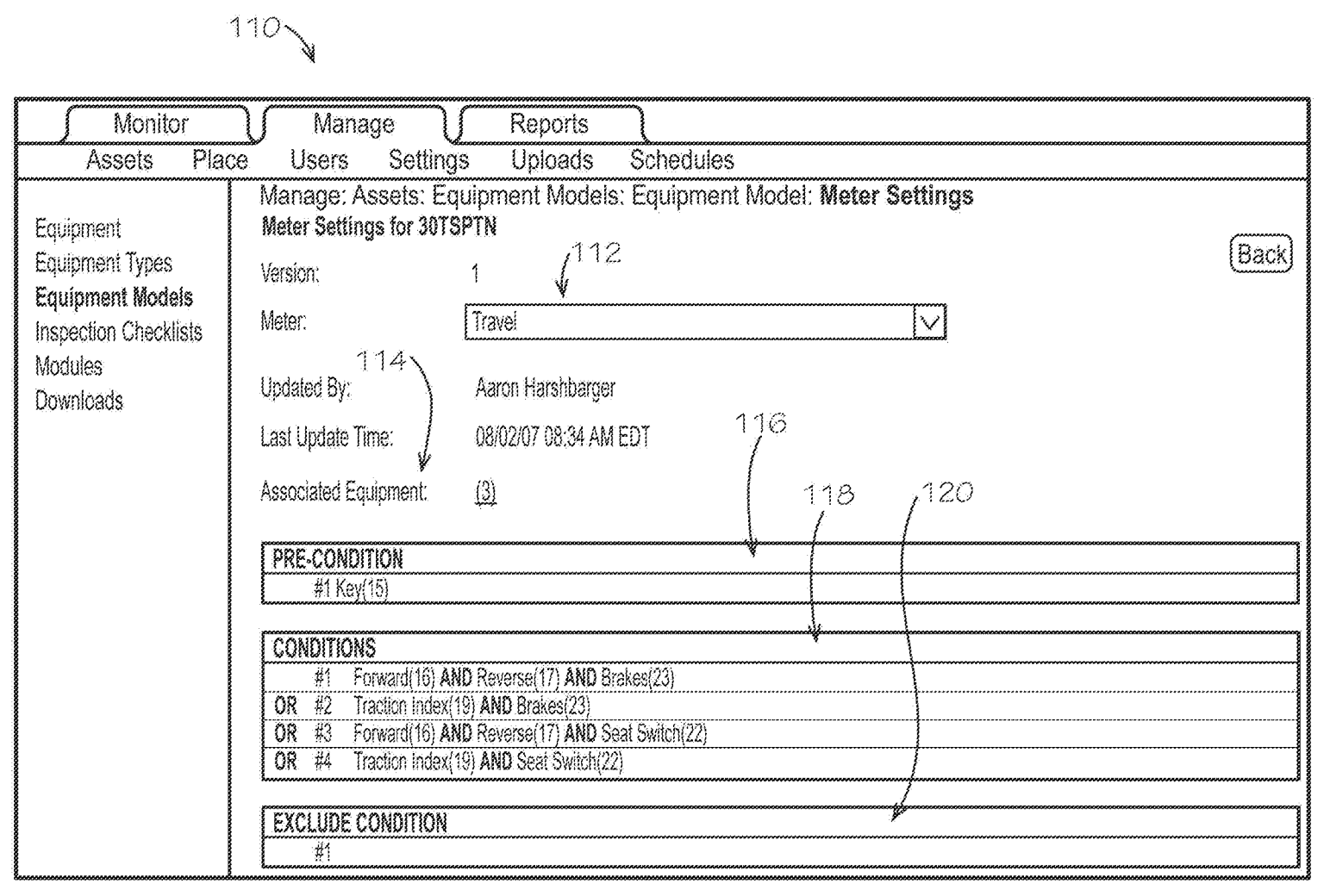

According to further aspects of the present invention, one or more hour meters may be user-definable and/or otherwise configurable. For example, referring to FIGS. 5-7, screenshots 110 illustrate an exemplary graphical user interface screen that may be utilized by the industrial vehicle application server 14 for defining features of one or more of the hour meters. As illustrated, the server software user may be able to select and/or identify the type of hour meter at 112, and select and/or otherwise associate the hour meter settings to one or more specific vehicles and/or vehicle types, classes or other logical groupings at 114. Moreover, for each hour meter, the operator may be able to establish one or more pre-conditions 116, conditions 118 and exclude conditions 120. By way of illustration, and not by way of limitation, FIG. 5 shows an exemplary approach for setting up a customized hydraulic hour meter. Likewise, FIG. 6 shows an exemplary approach for setting up a customized usage hour meter, and correspondingly, FIG. 7 shows an exemplary approach for setting up a customized travel hour meter. Although illustrated as pre-conditions, conditions and exclude conditions or rules, the actual definition of the hour meter logic may be expressed in other manners. Moreover, the management of customized hour meters may be displayed to the server operator in other formats and forms.

According to various aspects of the present invention, the hour meter selection and corresponding configuration data is wirelessly transmitted from the industrial vehicle application server 14 to the associated mobile asset(s) 12. The processor 50 or other suitable logic in each mobile asset 12 may then take responsibility of executing the hour meters according to the defined parameters/configuration data. Thus, the mobile assets 12 process the rules that define hour meter data for a given type of hour meter measurement.

Still further, according to various aspects of the present invention, one or more hour meters may be provided as completely programmable and customizable hour meters. By way of an illustrative example, the information linking device 38 may be provided by a first manufacturer. However, the device may be installed on a vehicle provided by a second manufacturer. Each manufacturer may have a different but known way of computing hour meter measurements. As such, a user can customize one or more hour meters even where the vehicle or components thereof are provided by different manufacturers.

Still further, the operator, either of the mobile asset 12 or user interacting with the industrial vehicle application server 14, can customize meters to record information that may be non-standard and/or to collect specific types of data for only a limited amount of time. The customizable hour meters of the present invention allow the creation of rules to define such events and/or compute hour measurements on other parameters or combinations of parameters. In the illustrative example, the mobile asset 12 includes a processor in the interface controller 50 that receives the hour meter specification wirelessly from the industrial vehicle application server 14 and automatically interprets the hour meter requirements based upon the specified rules, e.g., pre-conditions 116, conditions 118 and exclusions, i.e., exclude conditions 120.

The ability to generate different types of hour meter data allow fleet operators the ability to query data stored by the industrial vehicle application server 14 to generate reports related to truck equipment usage, which may be utilized for establishing cost of ownership, utilization statistics, etc. In the above description the phrase "hour meter" has been used to refer to a general concept of a usage meter based on user-definable conditions and parameters. In addition to measuring usage in terms of "hours", one of ordinary skill will recognize that other measurement metrics related to usage can alternatively be used without departing from the scope of the present invention. For example, to measure usage of a bearing for a rotating shaft, the number of shaft rotations could indicate usage. As another example, for a hydraulic pump, the cumulative gallons of fluid pumped may be an indication of usage. However, knowing the average revolutions per minute for the rotating shaft or the average gallons per minute pumped by the pump allows the usage of these example devices to be monitored in terms of "hours". Thus, in general, the user definable hour meters described above are a way to monitor or measure the usage of a component or aspect of a mobile asset that satisfies the preconditions, conditions and exclusions defined by the user.

Data Integration and Reporting

According to various aspects of the present invention, the data collected by the industrial vehicle application server 14 can be processed locally, e.g., using monitoring, managing and reporting tools provided as part of the server software. According to further aspects of the present invention, the data collected by the industrial vehicle application server 14 may be exported for use in other applications. For example, data selected from the industrial vehicle application server software may be downloaded to a generic file format, e.g., comma separated variable format or any other suitable format that is accessible by other applications.

According to still further aspects of the present invention, data stored in the data resource 16 may be freely exportable. By way of illustration, the industrial vehicle application server software may be configured to allow a user to export any of the raw data utilized to generate management reports within the industrial vehicle application server software. However, in certain embodiments, the industrial vehicle application server software may maintain control over certain data contents, such as vehicle event code values or other information that is deemed proprietary, confidential, or otherwise not intended for general review.

Vertical Integration

According to still further aspects of the present invention, the data in industrial vehicle application server 14 may be shared electronically with a remote server 30 such as the industrial vehicle manufacturer's servers. In this regard, the manufacturer may be able to provide insights into the collected data that is not within the capability of the associated enterprise 26. For example, the manufacturer may have existing software products for managing, diagnosing and repairing industrial vehicles. Still further, the manufacturer may have a built in infrastructure for managing vehicle generated data or for performing fleet management.

Figure 8:
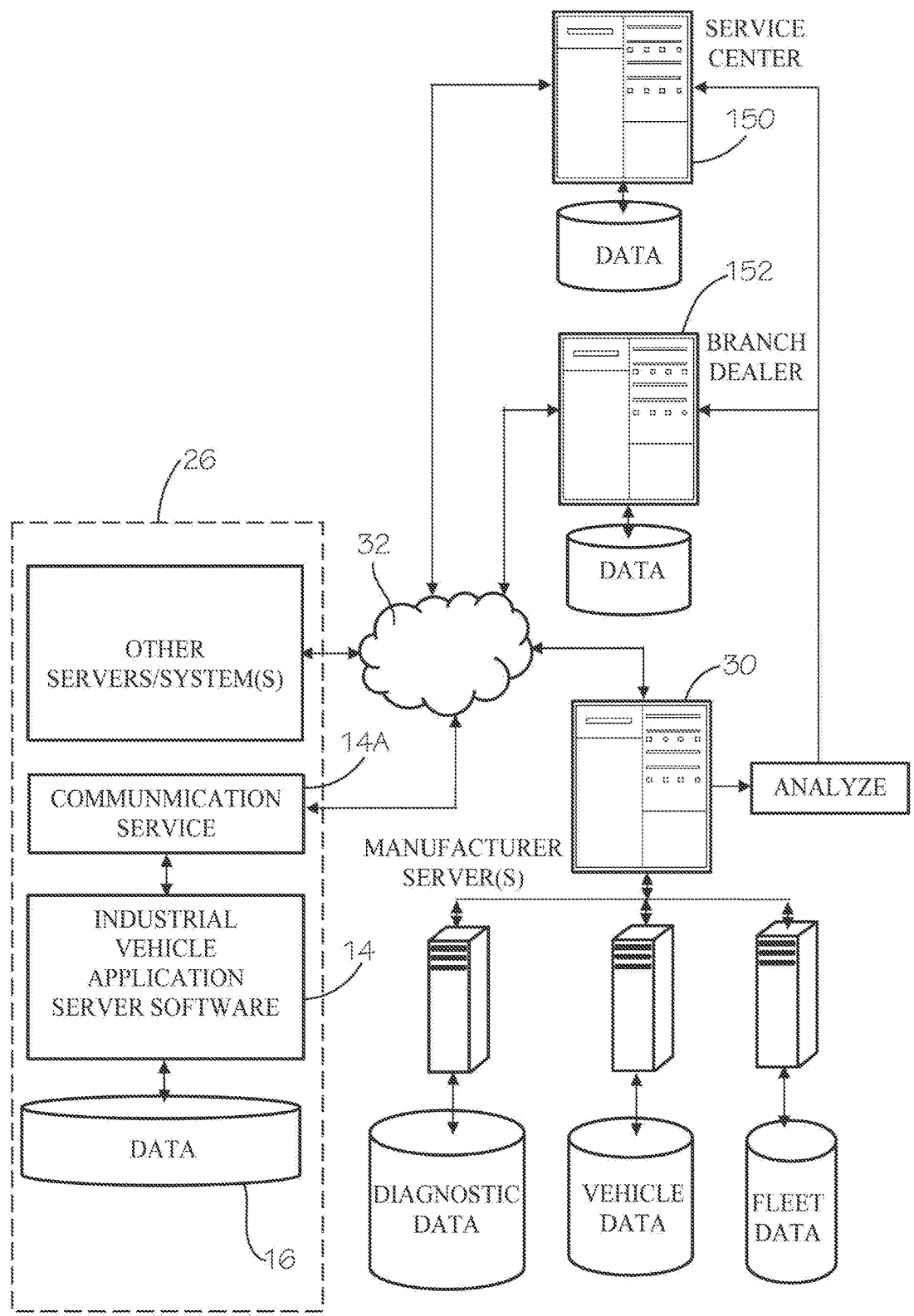
FIG. 8 is a block diagram of a system that integrates features of a manufacturer's computing system with a fleet operator's enterprise computing system according to various aspects of the present invention.

Referring to FIG. 8, the manufacturer may be able to leverage its resources, including resources obtained from its service centers and branch dealers, to optimize logistics performance for an enterprise in a manner that is more efficient than that possible by the enterprise on its own. Still further, the manufacturer may rely on its own knowledge, e.g., of its equipment and equipment capabilities to provide insight to a fleet operator utilizing the industrial vehicle application server 14 within their enterprise 26, such as to provide insight into realized productivity, etc.

By way of illustration and not by way of limitation, the manufacturer may be able to provide the fleet operator a more accurate estimate of the true cost of logistics by analyzing features associated with a combination of industrial vehicle data, operator data, and fleet data, including the applications being performed, e.g., based upon the information collected by the mobile assets 12 and corresponding industrial vehicle application server 14 executing within a given enterprise 26.

As an example, the fleet operator can farm the data collected by the industrial vehicle application server 14 to the vehicle manufacturer, who can load the data onto its server 30. By way of illustration, the industrial vehicle application server software may have integrated or otherwise associated therewith, a communication service 14A. The communication service 14A may facilitate communication with the manufacturer server 30. In this regard, the communication service 14A may be implemented using any practical technique to facilitate communication of data. For example, the communication service 14A may be setup by either the manufacturer or fleet operator to "wake up" at prescribed intervals, e.g., every night at a certain time, to transfer data, including data collected by the industrial vehicle application server 14 and/or other desired data to the manufacturer server 30. As another example, the manufacturer server 30 can poll, contact, or otherwise connect with the industrial vehicle application server 14. As yet further examples, the manufacturer server 30 can issue queries to request desired data from the industrial vehicle application server 14 and/or obtain the necessary data in other manners.

As yet a further illustrative example, the communication service may be implemented as a Web service. When the communication service 14A wakes up, it may contact the manufacturer server 30 to determine what data is desired by the manufacturer server 30. As another example, a scheduler or other solution may be utilized to establish when the data exchange takes place. The server exchange of data may also implement data exchange efficiencies, such as only conveying data that falls within a certain date range, e.g., as may be desired by the enterprise operator or as specified by the timestamp of a last data exchange.

In an illustrative example, the manufacturer server 30 can analyze data extracted from the industrial vehicle application server 14. The manufacturer server 30 can share the results of the analysis with the enterprise operator and/or implement workflows or other processing tasks based upon the analyzed results. For example, the manufacturer server 30 may analyze the data from a maintenance perspective. Based upon the analysis results, the manufacturer server 30 may trigger additional workflows, e.g., generating work requests for a service center 150, sending information to a branch dealer 152 etc. so that effective maintenance, service, proactive support etc., may be provided to the enterprise operator. For example, a service center 150 can schedule the maintenance/repair of mobile assets 12 in need of servicing in a manner that minimizes the intrusion of the downtime on the fleet operator.

According to various aspects of the present invention, productivity metrics can be evaluated by leveraging the capabilities of the industrial vehicle application server software. For example, the above-described hour meter data may be communicated from the industrial vehicle application server 14 to the manufacturer server computer 30. The manufacturer server computer can analyze the data not only in the context of the collected vehicle data, but also in the context of fleet management, e.g., using additional/independent software applications. Moreover, the results of analyzing the data from using a fleet management software at the manufacturer server 30 can be communicated back to the associated enterprise 26, e.g., for additional data processing by the industrial vehicle application server software and/or by other enterprise applications, legacy systems and software.

Having thus described the invention of the present application in detail and by reference to embodiments thereof, it will be apparent that modifications and variations are possible without departing from the scope of the invention defined in the appended claims.

What is claimed is:

1. A method of tracking usage of an industrial vehicle, the method comprising:
   establishing configuration data for an hour meter that tracks usage of an associated feature of an industrial vehicle, wherein the configuration data includes at least one rule that is based on inputs selected from a user interface and that indicates when the hour meter is to accumulate usage measurements;
   wirelessly communicating the configuration data from a server application to an associated industrial vehicle having a transceiver installed therewith for receiving wirelessly communicated messages from the server application;
   programming hour meter settings on the associated industrial vehicle that define when usage measurements of the associated feature tracked by the hour meter are accumulated in accordance with the at least one rule of the configuration data wirelessly received from the server application;
   operating the hour meter on the industrial vehicle to record usage of the associated feature according to the programmed hour meter settings; and
   providing a reading to indicate usage of the associated feature.

2. The method according to claim 1, wherein establishing configuration data for an meter further comprises:
   configuring the at least one rule as at least one precondition associated with determining a triggering event to begin the accumulation of time by the associated hour meter.

3. The method according to claim 1, wherein establishing the configuration data for an hour meter further comprises:
   configuring the at least one rule as at least one rule that defines a condition required for accumulating time by the associated hour meter.

4. The method according to claim 1, wherein establishing the configuration data for an hour meter further comprises:
   configuring the at least one rule as to include at least one exclude condition associated with the accumulation of time by the associated hour meter.

5. The method according to claim 1, wherein establishing the configuration data for an hour meter further comprises:
   establishing the at least one rule specific to a corresponding selected industrial vehicle from within a fleet of industrial vehicles.

6. The method according to claim 1, further comprising:
wirelessly transmitting hour meter data back to the server application; and
querying the hour meter information stored by the server application to ascertain data regarding usage of the industrial vehicle.

7. The method of claim 1, wherein programming hour meter settings further includes using a processor on the vehicle that interprets at least one rule as a rule wirelessly received from the server application to create an hour meter that is executed on the vehicle.

8. The method of claim 1, wherein programming hour meter settings further includes using a processor on the vehicle to operate the hour meter to track usage in a manner that is not measured by time.

9. The method of claim 1, wherein establishing configuration data further comprises establishing a rule to configure at least one time parameter associated with an meter for tracking usage of an associated feature of an industrial vehicle.

10. The method of claim 1, wherein establishing configuration data for an hour meter that tracks usage of an associated feature of an industrial vehicle further comprises establishing a rule that instructs the hour meter to perform a select one of:
recording non-standard information using conditions; and
limiting collection of data using exclusions.

11. The method of claim 1, wherein establishing configuration data further includes:
enabling a pin within a graphical user interface;
assigning a name to the pin; and
using the name of the pin as a parameter of the rule.

12. A method of tracking usage of an industrial vehicle, the method comprising:
receiving configuration data associated with an hour meter that tracks usage of an associated feature of an industrial vehicle, from a server application, by an industrial vehicle having a transceiver installed therewith for receiving wirelessly communicated messages from the server application, wherein the configuration data includes at least one rule that is based on inputs selected from a user interface and that indicates when the hour meter is to accumulate usage measurements;
programming hour meter settings that define when usage measurements of the associated feature on the associated industrial vehicle tracked by the hour meter are accumulated in accordance with the at least one rule of the configuration data wirelessly received from the server application;
operating the hour meter on the industrial vehicle to record usage of the associated feature according to the programmed hour meter settings; and
providing a reading to indicate usage of the associated feature.

13. The method according to claim 12, wherein receiving configuration data comprises receiving at least one rule that includes at least one of a pre-condition associated with determining a triggering event to begin accumulation of time by the transformed hour meter, a condition associated with the accumulation of time by the associated hour meter and exclude condition associated with the accumulation of time by the associated hour meter.

14. The method according to claim 12, further comprising:
wirelessly transmitting hour meter data back to the server application.

15. The method of claim 12, wherein programming hour meter settings further includes using a processor on the vehicle that interprets the rule wirelessly received from the server application to create an hour meter that is executed on the vehicle.

16. The method of claim 12, wherein programming hour meter settings further includes using a processor on the vehicle to operate the hour meter to track usage in a manner that is not measured by time.

17. The method of claim 12, wherein receiving configuration data further comprises receiving at least one rule to configure at least one time parameter associated with an hour meter for tracking usage of an associated feature of an industrial vehicle.

18. An industrial vehicle comprising:
a power unit;
an operator's compartment associated with the power unit;
a vehicle network bus;
at least one drive wheel coupled to the power unit controllably coupled to a motor controller, which is mounted on the industrial vehicle and coupled to the vehicle network bus;
a wireless transceiver mounted on the industrial vehicle and coupled to the vehicle network bus configured to receive configuration data from a server application, the configuration data including a rule associated with an hour meter that tracks usage of an associated feature of the industrial vehicle, wherein the rule is based on inputs selected from a user interface and indicates when the hour meter is to accumulate measurements;
a processor mounted on the industrial vehicle configured to program hour meter settings that define when usage measurements of the associated feature tracked by the hour meter are accumulated in accordance with at least the rule wirelessly received from the server application, wherein the processor is configured to operate the hour meter on the industrial vehicle to record usage of the associated feature according to the programmed hour meter settings; and
a display viewable from the operator's compartment, which is configured to provide a reading of the usage of the associated feature.

19. The industrial vehicle of claim 18, wherein the rule includes at least one of a pre-condition associated with determining a triggering event to begin accumulation of time by the transformed hour meter, a condition associated with the accumulation of time by the associated hour meter and exclude condition associated with the accumulation of time by the associated hour meter.

20. The industrial vehicle of claim 18, wherein the processor is further configured to program an hour meter to operate in accordance with at least the rule wirelessly received from the server application by interpreting the rule wirelessly received from the server application to create an hour meter that is executed on the vehicle.

* * * * *